(12) United States Patent
Hirate et al.

(10) Patent No.: US 9,592,848 B1
(45) Date of Patent: Mar. 14, 2017

(54) ELECTRIC POWER STEERING CONTROLLER

(71) Applicant: DENSO CORPORATION, Kariya, Aichi-pref. (JP)

(72) Inventors: Yosuke Hirate, Kariya (JP); Motoaki Kataoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/886,416

(22) Filed: Oct. 19, 2015

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |
| B62D 5/04 | (2006.01) |

(52) U.S. Cl.
CPC .................. B62D 5/0463 (2013.01)

(58) Field of Classification Search
CPC ..................................................... B62D 5/0463
See application file for complete search history.

(56) References Cited

U.S. PATENT DOCUMENTS

| | | | | |
|---|---|---|---|---|
| 2002/0125063 | A1* | 9/2002 | Kurishige | B62D 6/008 180/443 |
| 2003/0163237 | A1* | 8/2003 | Kim | B60T 8/1755 701/70 |
| 2007/0100524 | A1* | 5/2007 | Sakaguchi | B62D 5/0466 701/41 |
| 2012/0199414 | A1* | 8/2012 | Shimizu | B62D 5/0463 180/446 |
| 2013/0060427 | A1 | 3/2013 | Kataoka et al. | |

FOREIGN PATENT DOCUMENTS

JP   2004-299492 A   10/2004

* cited by examiner

*Primary Examiner* — Imran Mustafa
(74) *Attorney, Agent, or Firm* — Knobbe, Martens, Olson & Bear, LLP

(57) ABSTRACT

An electric power steering controller adjustably generates a target steer torque dynamically by weighting (i) a load based target steer torque that is determined based on an estimated load and (ii) a steer angle based target steer torque with a weighting ratio. The weighting ratio varies depending on a condition of a road surface on which a subject vehicle is traveling, a steering state of the driver and the like, which enables an adjustment of the target steer torque to suitably accommodate the condition of the road surface and to provide a road surface conscious steering feel while achieving robustness over an influence of a friction of the mechanical components in a steering system.

15 Claims, 11 Drawing Sheets

PRODUCT OF STEERING SPEED AND STEER TORQUE [N·m·rad/sec]

ELECTRIC POWER STEERING CONTROLLER

CROSS REFERENCE TO RELATED APPLICATION

The present application is based on Japanese Patent Application No. 2014-088485, filed on Apr. 22, 2014, the disclosure of which is incorporated herein by reference.

TECHNICAL FIELD

The present disclosure generally relates to an electric power steering controller for controlling an electric power steering system which assists a steering operation of a driver in a vehicle by using a motor.

BACKGROUND INFORMATION

The electric power steering controller disclosed in a patent document, JP 2013-52793 A (patent document 1) estimates a road surface load from a steer torque and an assist torque instruction value, and sets a target steer torque from the estimated road surface load. More specifically, based on the sum of the steer torque and the assist torque instruction value, a total steer torque that is applied to the mechanical element of the steering system is estimated. The total steer torque tends to become greater as the road surface load increases, thereby enabling a setting of the target steer torque based on an assumption that the total steer torque is equal to the road surface load.

Further, the motor is driven based on the assist torque instruction value that is calculated from a deviation of the steer torque from the target steer torque, so that the steer torque matches (e.g., is equated to) the target steer torque by the assist torque generated by the motor. According to the above-described configuration of the patent document 1, the target steer torque is controlled to have a value according to the road surface load, thereby providing, for the driver, a steering feel that accords with the road surface load when he/she operates a steering wheel.

Further, in the electric power steering controller disclosed in another patent document, JP 2004-299492 A (Patent document 2), for example, the target steer torque is generated based on the steer angle, and the electric power steering controller controls the assist torque output from the motor to match the target steer torque.

An increase of the frictional force of the mechanical elements of the steering system, which are controlled objects of the electric power steering controller, leads to an increase of a required torque for a driver-desired steering operation.

In the technique of the patent document 1, the road surface load is estimated as an addition of the frictional force of the elements of the steering system to the actual road surface load. Thus, when the frictional force of the elements increases, the estimated load has to have a greater value. In other words, since the estimated load is used to generate the target steer torque, an increase of the estimated load under the influence of the frictional force of the elements of the steering system leads to an increase of both of the target steer torque and the assist torque instruction value.

Under the influence of the frictional force (i.e., friction), when the steering wheel is steered toward one of the extreme positions to the right or to the left (i.e., a steer-away situation), the target steer torque at the time of such steering operation has to be increased, thereby necessitating an increase of the steer torque to have a large value.

In a steering wheel return situation, in which the steering wheel is steered back to a neutral position (i.e., a steer-back situation), under the influence of the friction, the steer torque decreases to 0 before the steer angle actually returns to 0 degree.

In other words, a returnability of the steering wheel, (i.e., ability for the steering angle to return to 0 degree), is poor under the influence of the friction, thereby necessitating the driver to "force" the steering wheel to return to the neutral position.

In particular, on a small friction road surface where a friction between the tire and the road surface is very small (i.e., on a low μ road), the influence on the steering operation, on the friction of the mechanical elements of the steering system increases relative to (i.e., in comparison to) the travel on a high μ road.

Therefore, on the low μ road, the steering toque in the steer-away situation is under a relatively-large influence of the friction of the elements of the steering system. In addition, when the influence of the friction is large, the returnability of the steer angle is greatly deteriorated.

Further, a self-aligning torque at the time of a low speed travel decreases in comparison to a high speed travel time, which also results in an increase of the friction influence of the steering system, thereby deteriorating the returnability of the steer angle.

On the other hand, in the electric power steering controller of the patent document 2, the target steer torque is determined according to the steer angle, and the target steer torque is not affected (i.e., changed) by the change of the friction of the mechanical elements of the steering system.

Therefore, the change of the friction of the mechanical element of the steering system does not affect the steering feel of the driver at the time of steering the steer wheel to a certain steer angle of a predetermined value.

However, the target steer torque in the patent document 2 is not changed according to the change of the road surface load. Therefore, such a configuration does not allow the driver to feel the change of the road surface load when he or she operates the steering wheel.

For example, it makes no difference for the driver in terms of steering feel whether he or she is traveling on the high μ road or on the low μ road. In other words, it is impossible for the driver to sense (i) the road surface condition (e.g., a friction coefficient between the tire and the road surface) or (ii) a grip of a steered tire on the road etc., based on the steering feel of the steering wheel, thereby deteriorating the operability of the steering system than one in the patent document 1.

SUMMARY

It is an object of the present disclosure to provide an electric power steering controller that has improved robustness for an influence of mechanical friction while providing a road surface load conscious steering feel.

In an aspect of the present disclosure, an electric power steering controller is disposed in an electric power steering system that has a motor generating an assist torque that assists a steering operation of a steering member that is operated by a driver of a subject vehicle, a torque detector detecting a steer torque that is applied to the steering member, and a steer angle detector detecting a steer angle of a rotation member that rotates according to the steering operation of the steering member. The controller includes an Electronic Power Steering Electronic Control Unit (EPSECU), the EPSECU configured to include a load estimator that estimates an estimated load based on a torque that is applied to a steering mechanism for a driver-desired steering of a subject vehicle, a load based target determiner that generates a first target steer torque as a load based target steer torque based on the estimated load estimated by the load estimator, a steer angle based target determiner that generates a second target steer torque as a steer angle based target steer torque based on the steer angle detected by the steer angle detector, a target steer toque generator that generates a target steer torque as a target value of the steer torque based on the load based target steer torque and the steer angle based target steer torque, and a motor controller section that controls the motor to output the steer torque therefrom according to the target steer torque. The target steer torque generator includes a weighting ratio determiner that determines a weighting ratio according to a steering system state indicator value that is determined based on at least one of the steer amount of the steering member by the driver and the estimated load. Also, the target steer torque generator generates the target steer torque by performing a weighted addition of the load based target steer torque and the steer angle based target steer torque.

In the above-described configuration, the target steer torque generator generates a target steer torque by performing a weighted addition of the load based target steer torque and the steer angle based target steer torque respectively weighted by a weight that is determined by the weighting ratio determiner.

Here, the load based target steer torque is generated based on the estimated load that is estimated by the load estimator, thereby being changed with a change of the road surface load. When the target steer torque includes the load based target steer torque as a component, the target steer torque also changes with the change of the road surface load. Therefore, according to such configuration, a road surface load conscious steering feel is provided for the driver.

Further, the steer angle based target steer torque is generated without using the values that are affected by the friction of the mechanical components in the steering system, thereby generating friction-influence free values. Therefore, when the target steer torque includes the component of not only the load based target steer torque but also the steer angle based target steer torque, an influence of mechanical components of the steering system is mitigated/eased, and robustness over the influence of friction of the mechanical components of the steering system is improved.

Here, the ratio of the components in the target steer torque (i.e., a component of the load based target steer torque and a component of the steer angle based target steer torque) is determined by a weighting ratio which is determined by the weighting ratio determination part.

Since the weighting ratio is determined according to the steering system state indicator value which is set based on a steering operation on the steering component performed by the driver, the weighting ratio of the two components in the target steer torque is dynamically changeable according to the change of the steering system state indicator value.

In other words, the weighting ratio determination part determines the weighting ratio according to a steering state and a road surface state which are estimated from the steering system indicator value, and the ratio of the two components in the target steer torque is changed according to the weighting ratio. Therefore, while providing a road surface load conscious steering feel, improved robustness over an influence of the mechanical friction is realized by the steering controller of the present disclosure.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiment

Configuration of an Entire Controller

Figure 1:
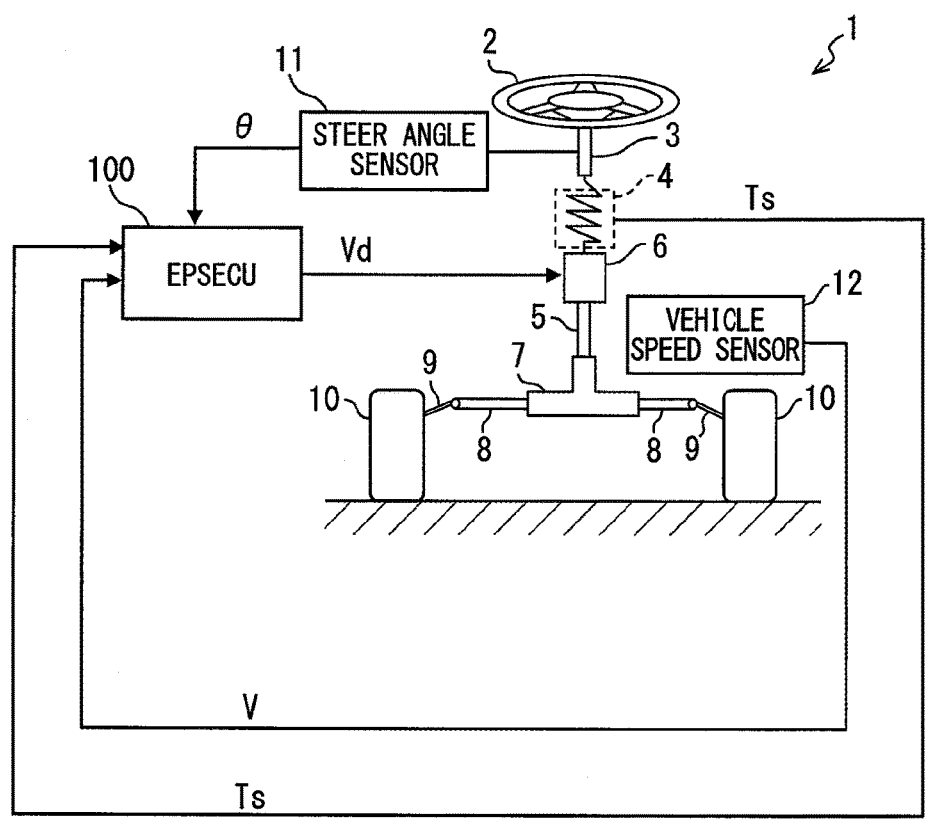
FIG. 1 is a block diagram of an electric power steering system in an embodiment of the present disclosure.

An embodiment of the present disclosure is described in the following with reference to the drawings. An electric power steering system 1 shown in FIG. 1 assists a driver's operation of a steering wheel 2 by using a motor 6.

The steering wheel 2 is fixedly attached to one end of a steering shaft 3 which is an input shaft. A torque sensor 4 is connected to the other end of the steering shaft 3, and an intermediate shaft 5 is connected to the other end of the torque sensor 4.

The torque sensor 4 is a sensor for detecting a steer torque Ts, and is equivalent to a torque detector. The torque sensor 4 includes a torsion bar which connects the steering shaft 3 and the intermediate shaft 5, and detects a torque currently applied to the torsion bar based on a torsion angle of the torsion bar.

The torsion angle of the torsion bar is represented by a difference of rotation angles between the two parts (i.e., between the steering shaft 3 and the intermediate shaft 5), and a positive rotation direction represented by a positive torsion angle is the same as a rotation direction represented by a positive steer angle θ that is detected by a steer angle sensor 11. Therefore, the steer torque Ts detected by the torque sensor 4 has a positive sign or a negative sign, representing a rotation direction of the steering wheel and/or the steering system.

The motor 6 assists an operation of the steering wheel 2 with a steering force. The motor 6 has a worm gear disposed at a tip of a rotation shaft, and the worm gear engages with a worm wheel provided on the intermediate shaft 5. Thereby, a rotation of the motor 6 is transmitted to the intermediate shaft 5.

On the contrary, when the intermediate shaft 5 is rotated by a torque inputted from an operation of the steering wheel 2 or from the road surface, the rotation of the shaft 5 is transmitted to the motor 6 and the motor 6 is rotated.

The other end of the intermediate shaft 5 (i.e., an end that is opposite to the torque sensor 4 connected end) is connected to a steering gear box 7. The steering gear box 7 is a gear mechanism including a rack and a pinion gear (not illustrated), and gear teeth of the rack gear engages with the pinion gear provided on the other end of the intermediate shaft 5. Therefore, if the driver rotates the steering wheel 2, the intermediate shaft 5 rotates, and the rack moves to the right or to the left. A tie rod 8 is attached to both ends of the rack, respectively, and the tie rod 8 translates to the right and to the left together with the rack. Thereby, when the tie rod 8 pushes and pulls a knuckle arm 9 connected to the tie rod 8, a steered tire 10 is steered to the right and to the left.

The steer angle sensor 11, which detects a rotation angle of the steering shaft 3, is disposed on the steering shaft 3. The steer angle sensor 11 is equivalent to a steer angle detector.

Since the steering shaft 3 rotates with the steering wheel 2, an angle detected by the steer angle sensor 11 is a steer angle θ. The steer angle θ is, with reference to a neutral position (i.e., a steer angle of 0 degree at which the vehicle travels straight forward), measured as a positive value when steered to one of the right and the left, and as a negative value when steered the other way. A signal indicative of the steer angle θ is inputted to EPSECU 100.

A speed sensor 12 for detecting a vehicle speed V is provided at a predetermined position in the vehicle. A signal indicative of the vehicle speed V is also inputted to EPSECU 100.

According to such configuration, when the driver rotates the steering wheel 2, the rotation is transmitted to the steering gear box 7 via steering shaft 3, the torque sensor 4, and the intermediate shaft 5. Then, the rotation of the intermediate shaft 5 is turned into the right and left movement of the tie rod 8 and the tie rod 8 moves in the steering gear box 7, thereby the steered tire 10 is steered to the right or to the left.

EPSECU 100, which may be an electric power steering controller, operates with an electric power from an in-vehicle battery (not illustrated).

EPSECU 100 calculates an assist torque instruction value Ta* based on the steer torque Ts detected by the torque sensor 4, the steer angle θ detected by the steer angle sensor 11, and the vehicle speed V detected by the speed sensor 12. Then, the assist torque from the motor 6 for assisting the driver to rotate the steering wheel 2 is controlled by controlling the motor 6 based on the assist torque instruction value Ta*.

Figure 2:
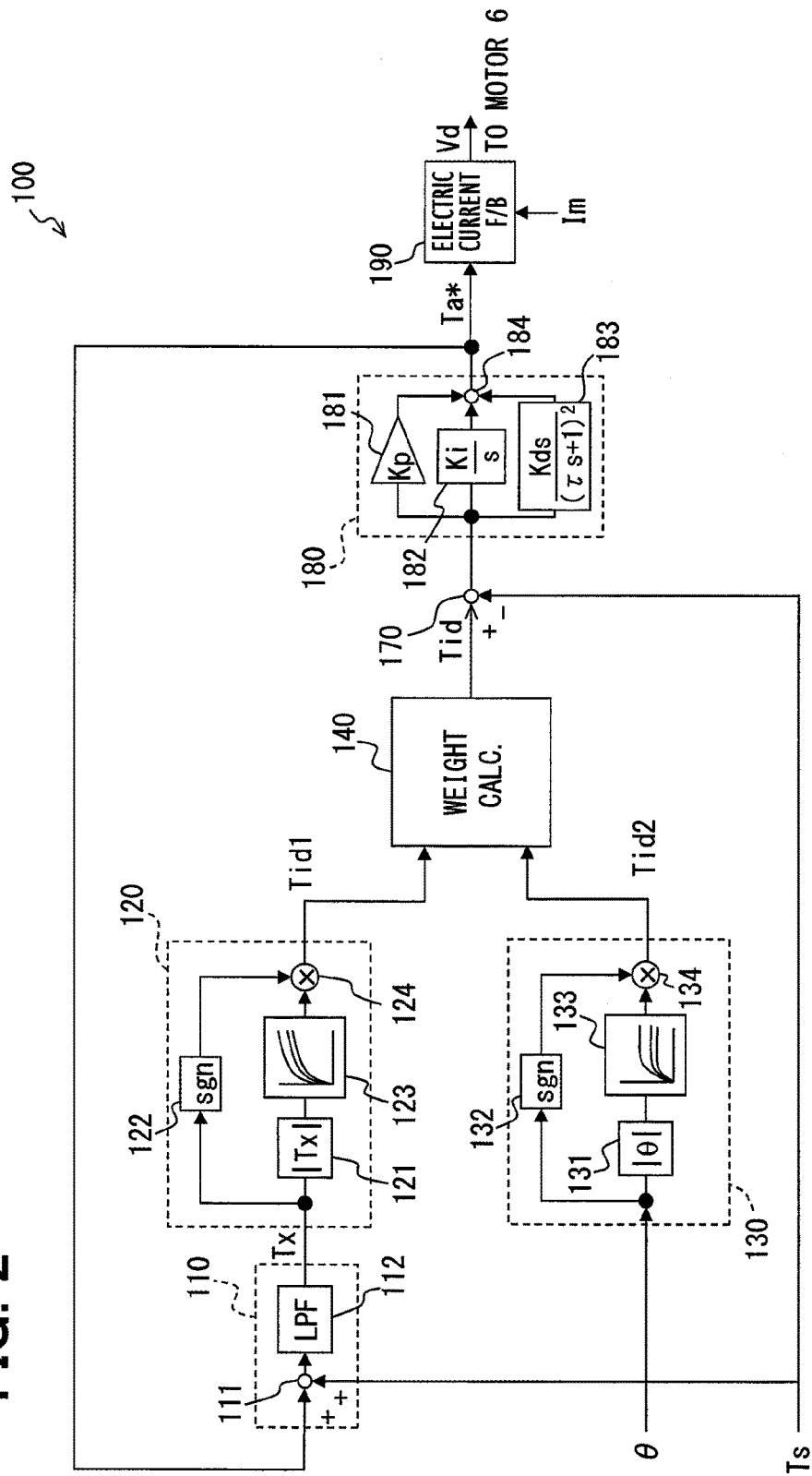
FIG. 2 is a block diagram of components in an EPSECU in the embodiment of the present disclosure.

The components of EPSECU 100 are illustrated in FIG. 2. EPSECU 100 is provided with a load estimation part 110, a load based target determination part 120, a steer angle based target determination part 130, a weighting calculation part 140, a subtraction part 170, a servo controller 180, and an electric current feedback part 190.

The load estimation part 110 includes an adder 111 and a low pass filter 112. The adder 111 adds the assist torque instruction value Ta* to the steer torque Ts. The high frequency noise in the added value is removed by the low pass filter 112. The value outputted from the low pass filter 112 is an estimation value of a torque that is outputted from the steering wheel and from the motor 6 to be applied to the intermediate shaft 5.

As a reaction force applied from the road surface to the steered tire 10 (i.e., the road surface load) increases, a torque required for a driver-desired steering increases. Therefore, a torque applied to the intermediate shaft 5 (i.e., an output value of the load estimation part 110) increases, as the road surface load increases. In other words, based on a relationship between the output value of the load estimation part 110 and the road surface load, the road surface load is calculable. Therefore, the output value of the load estimation part 110 is designated in the following as an estimated load Tx. The road surface load is a torque that may also be designated as a self-aligning torque, as a road surface reaction force.

In the art of steering control, it is known that the driver operates the steering wheel in reliance on a reaction force from the steering wheel mainly in a frequency range of 10 Hz or lower. Therefore, the low pass filter 112 is in this case configured to pass a frequency component of 10 Hz or lower, for example. The load based target determination part 120 is provided with an absolute value generation part 121, a sign generation part 122, a load based target steer torque generation part 123, and a multiplier 124.

The estimated load Tx, which is outputted from the load estimation part 110 is inputted to the absolute value generation part 121 and to the sign generation part 122.

The absolute value generation part 121 generates an absolute value of the estimated load Tx. The sign generation part 122 is provided with a sign function, which generates 1 when receiving a positive input value of the estimated load Tx, or generates −1 when receiving a negative input value of the estimated load Tx.

The absolute value of the estimated load Tx, which is generated by the absolute value generation part 121, is inputted to the load based target steer torque generation part 123. Further, the vehicle speed V is also inputted to the load based target steer torque generation part 123.

Figure 3:
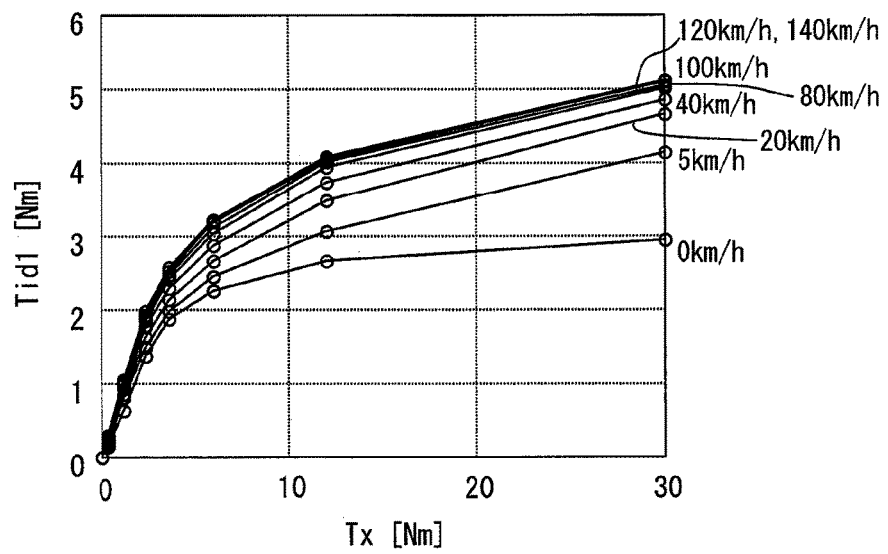
FIG. 3 is a graph of a target steer torque generation map used by a load based target steer torque generation part in FIG. 2.

The load based target steer torque generation part 123 is provided with a load based target generation map illustrated in FIG. 3, and calculates an absolute value of a load based target steer torque Tid1 based on (i) the load based target generation map concerned, (ii) the vehicle speed V, and (iii) the absolute value of the estimated load Tx.

The load based target generation map is a data map that maps, (i.e., determines the absolute value of the target steer torque Tid corresponding to the absolute value of the estimated load Tx for every preset travel speed of the vehicle. In FIG. 3, the map represents, as an example, a relationship between the absolute value of the estimated load Tx and the absolute value of the load based target steer torque Tid1 for every 20 km/h of the vehicle speed.

For every vehicle speed V, an increase of the absolute value of the absolute value of load based target steer torque Tid1 is logarithmic to an increase of the absolute value of the estimated load Tx.

The load based target steer torque generation part 123 uses a linear interpolation of the map of FIG. 3 when it is calculating the absolute value of the load based target steer torque Tid1, based on an input of the vehicle speed V, and the estimated load Tx.

The multiplier 124 performs a multiplication of the absolute value of the load based target steer torque Tid1 that is calculated by the load based target steer torque generation part 123, by a value of 1 or −1 that is generated by the sign generation part 122. The value after the multiplication is the load based target steer torque Tid1.

The load based target steer torque Tid1 calculated in the above-described manner is serially (i.e., one by one) outputted to the weighting calculation part 140. The weighting calculation part 140 determines a final target steer torque Tid based on the load based target steer torque Tid1.

The information regarding a vehicle state or the road surface load is transferrable to the driver, as described in the patent document 1, by determining the final target steer torque Tid based on the estimated load Tx.

More practically, as the friction between the road surface and the tire increases, the road surface load (i.e., the estimated load Tx) increases, thereby increasing the load based target steer torque Tid1. Therefore, even when the steer angle θ and the vehicle speed V are the same in a large friction time and in a small friction time, a required steer torque for the driver to steer the steering wheel increases in a large friction time (i.e., on a high μ road). In this case, due to an increase of both of the estimated load Tx and the load based target steer torque Tid1, the required steer torque increases in comparison to a small friction time.

On the other hand, on a low μ road, even when the steer angle θ and the vehicle speed V are the same as the large friction time, the estimated load Tx and the target steer torque Tid become small relatively, and the torque felt by the driver from the steering wheel 2 also becomes small.

In other words, the load based target steer torque Tid1 includes the information regarding the road surface (e.g., the friction between the road surface and the tire) and the like. Therefore, by controlling or driving the motor 6 to generate the target steer torque Tid that is based on the load based target steer torque Tid1, the state of the road surface is conveyed to the driver. That is, the target steer torque Tid that is a required torque for steering the steering wheel conveys the vehicle state and/or the road surface state in an easily sensible manner to the driver, thereby improving the steering feel of the steering wheel and the operation feel of the vehicle.

The steer angle based target determination part 130 is provided with an absolute value generation part 131, a sign generating part 132, a steer angle based target steer torque generation part 133, and a multiplier 134.

The absolute value generation part 131 receives an input of the steer angle θ detected by the steer angle sensor 11, and generates an absolute value of the steer angle θ. The sign generation part 132 also receives an input of the steer angle θ detected by the steer angle sensor 11. The sign generation part 132 having a sign function generates a value of 1 when the input has a positive value, or generates a value of −1 when the input has a negative value.

The steer angle based target steer torque generation part 133 is provided with a steer angle based target generation map. The steer angle based target generation map is a map of a relationship between the steer angle θ and the absolute value of the steer angle based target steer torque Tid2.

Although the steer angle based target generation map differs in the input value from the load based target generation map of FIG. 3, the trend of the output value over the input value is the same. That is, the steer angle based target generation map outputs a larger absolute value of the steer angle based target steer torque Tid2 as the steer angle θ increases. Further, the relationship between the absolute value of the steer angle based target steer torque Tid2 and the steer angle θ is stored for various travel speeds V of the vehicle, which is defined in a similar manner as the load based target generation map (i.e., as the steed V increases, the absolute value of the steer angle based target steer torque Tid2 increases).

The steer angle based target steer torque generation part 133 uses a linear interpolation of the map when calculating the absolute value of the steer angle based target steer torque Tid2 based on an input of the vehicle speed V and the steer angle θ.

The multiplier 134 performs a multiplication of the absolute value of the steer angle based target steer torque Tid2 calculated by the steer angle based target steer torque generation part 133 by a value of 1 or −1 that is generated by the sign generation part 132. The value after the multiplication is the steer angle based target steer torque Tid2.

The steer angle based target steer torque Tid2 calculated in the above-mentioned manner is serially (i.e., one by one) outputted to the weighting calculation part 140 just like the load based target steer torque Tid1.

Based on a predetermined weighting ratio α, the weighting calculation part 140 performs weighting of each of the load based target steer torque Tid1 and the steer angle based target steer torque Tid2, adds one to the other, and generates the final target steer torque Tid. Therefore, the weighting calculation part 140 is equivalent to a target steer torque generator.

The weighting ratio α determines an amount of contribution of each of the load based target steer torque Tid1 and the steer angle based target steer torque Tid2 to the target steer torque Tid, and is determined by a weighting ratio determiner 150 mentioned later. In the present embodiment, the weighting ratio α fulfills a relationship $0 \leq \alpha \leq 1$, and the target steer torque Tid is calculated as a sum of (i) a product of α and the load based target steer torque Tid1 and (ii) a product of 1−α and the steer angle based target steer torque Tid2. Details of the calculation by the weighting calculation part 140 are mentioned later.

The target steer torque Tid generated by the weighting calculation part 140 is inputted to the subtraction part 170. The subtraction part 170 subtracts the steer torque Ts from the target steer torque Tid. That is, in the subtraction part 170, a torque deviation ΔT, which is a deviation of the target steer torque Tid from the steer torque Ts, is calculated. The torque deviation ΔT is inputted to the servo controller 180.

The servo controller 180 calculates the assist torque instruction value Ta* so that the torque deviation ΔT is reduced to zero, that is, so that the steer torque Ts is equated to the target steer torque Tid. The assist torque instruction value Ta* represents a desired value of the assist torque to be outputted by the motor 6.

The servo controller 180 is provided with a proportionizer 181, an integrator 182, a differentiator 183, and an adder 184.

The proportionizer 181 multiplies the torque deviation ΔT by a gain Kp. The integrator 182 performs an integration calculation for the torque deviation ΔT with an integration constant Ki. The differentiator 183 performs a differentiation calculation of the torque deviation ΔT by a differentiation constant Kd. A character "s" is a Laplacian operator and a character "τ" is a time constant.

The assist torque instruction value Ta* is inputted to the electric current feedback part 190 and to the adder 111 mentioned above.

Based on the assist torque instruction value Ta*, the electric current feedback part 190 applies a drive voltage Vd to the motor 6 so that the assist torque corresponding to the assist torque instruction value Ta* is provided to a certain part of the steering mechanism, which is a part closer to the steered tire 10 relative to the torque sensor 4.

More specifically, based on the assist torque instruction value Ta*, a target electric current to be supplied to each phase of the motor 6 is set. Then, the electric current value Im of each phase is detected, and the detected electric current is controlled to be equated to the target electric current by the control of the drive voltage Vd, for a generation of the desired assist torque. The electric current feedback part 190 is equivalent to a motor controller section.

(Comparative Configuration)

Before describing a concrete configuration of the weighting calculation part 140, a load based configuration, which serves as a comparison configuration to the present embodiment, is described.

The load based configuration is a configuration in which the load based target steer torque Tid1 is directly inputted (i.e., as an as-is value) to the subtraction part 170 as the final target steer torque, and the difference between the load based target steer torque Tid1 and the steer torque Ts is inputted to the servo controller 180.

Figure 4:
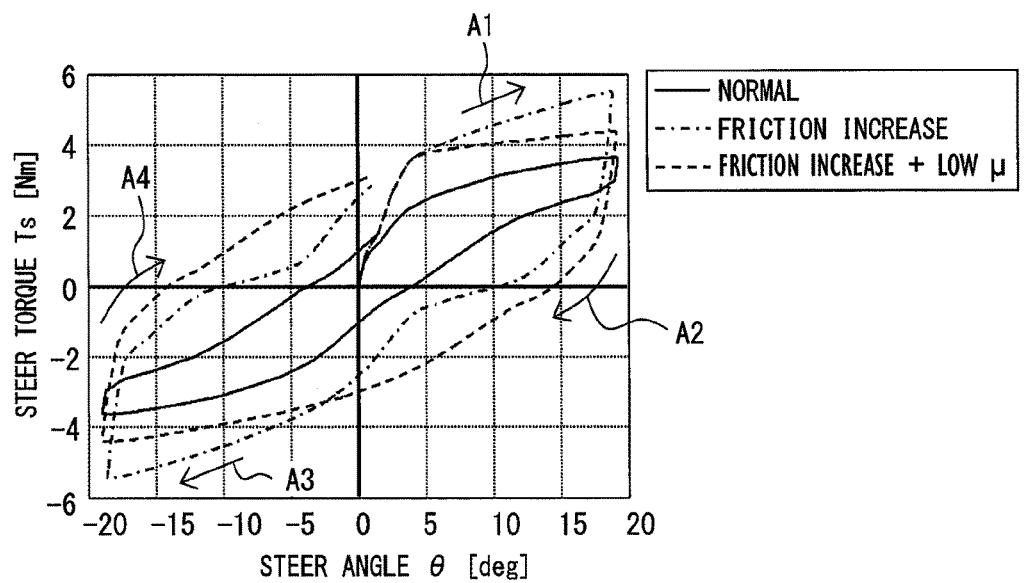
FIG. 4 is a graph of a relationship between a steer angle and a steer torque in a load based configuration.

FIG. 4 is a graph of a relationship between the steer angle θ and the steer torque Ts in the load based configuration, in which the vehicle speed is kept at a constant value and the steer angle θ of the steering operation is controlled to draw a sine curve.

In FIG. 4, the relationship between the steer angle θ and the steer torque Ts is shown, and a graph with a solid line represents a normal time, a graph with a one-dot short-dash line represents a friction increased time when the friction of the steering system is increased from the normal time, and a graph with a broke line represents a friction increased time on the low μ road (i.e., a coefficient of friction μ=0.2) (i.e., when the friction of the components in the steering system is increased from the normal time while the vehicle is traveling on the low μ road). In the following, the travel of the vehicle on the low μ road may be designated as a low μ road travel time.

Mechanical components in the steering system are the parts of the mechanism constituting a torque transmission path from the steering shaft 3 to the steered tire 10.

As a friction increase factor of the mechanical components of the steering system, the aging of those components, as well as temperature of the environment in which the vehicle is traveling and the like may be considered. For example, in a below-freezing point environment (e.g., when the temperature is extremely low under a zero degree of Celsius), the friction of the gear mechanism consisting of the rack and pinion gear may increase.

The graph in FIG. 4 is basically in a point-symmetric shape around the origin, which simplifies an explanation of the graph only for a first quadrant (i.e., for a positive part of the steering angle θ). In each of the graphs, an arrow A1 indicates a path along which the steering wheel is steered away from the neutral position with an increase of the steer angle θ. That is, the relationship of the steer angle θ and the steer torque Ts in the steer-away operation is illustrated by a portion of the graph around the arrow A1.

In the first quadrant of the graph in FIG. 4, as readily understood from a comparison between the solid line of the normal time and the one-dot short-dash line of the friction increase time, the increase of the friction of the components of the steering system leads to the increase of the steer torque in the steer-away operation.

This is because the load based target steer torque Tid1 is set to have a large value, as the friction of the mechanical components increases. More practically, when the friction of the mechanical components of the steering system, which is a controlled object of the controller 100, increases, the load estimation part 110 estimates the road surface load by adding, to the actual road surface load, the friction of the mechanical components of the steering system.

Therefore, if the friction of the mechanical components of the steering system increases, the estimated load Tx will be estimated as a greater value. Further, the load based target steer torque Tid1 is configured to increase as the estimated load Tx increases. Thus, as the estimated load Tx increases under the influence of the increased friction of the mechanical components of the steering system, the load based target steer torque Tid1 increases.

Further, when returning the steering wheel to the neutral position (i.e., when the steer angle θ decreases to a small value (i.e., a path along an arrow A2 in FIG. 4), the steer torque Ts falls down to zero at the steer angle θ of about 4 degrees in the normal time. The same thing (i.e., the steer torque Ts falling down to zero) happens in the friction increased time at a much earlier timing (i.e., at the steer angle θ of about 10 degrees). Further, the wave form of the friction increased time is swelled further down in the fourth quadrant than wave form of the normal time.

Now, the path in the fourth quadrant, where the steer angle θ is positive and the steer torque Ts is negative, indicates the steer-back operation of returning of the steering wheel back to the neutral position (i.e., to the steer angle of zero degree), with a resisting steer torque Ts generated in the steering system, which resists to the returning of the steering wheel to the neutral position. In other words, the driver needs to apply a positive steer torque Ts to the steering wheel 2 along a steer-back direction.

That is, the returnability of the steering wheel worsens when the friction of the steering system increases according to the graph in FIG. 4. In other words, for the returning of the steering wheel back to the neutral position, the driver has to apply a positive steer torque Ts to the steering wheel 2.

The reason why the returnability of the steering wheel 2 worsens when the friction of the steering system increases is that a self-aligning torque, which is a force due to the friction between road surface and the steered tire 10 causing both of the tire 10 and the steering wheel 2 to return to the neutral position, is cancelled by the increased friction of the mechanical components of the steering system.

Further, as shown in FIG. 4, the wave form of the graph in the broken line, which is a situation when the friction increases and in the low μ road travel time, further swells down to a lower part in the fourth quadrant than wave form of the friction increased time in the one-dot short-dash line. This means that the returnability of the steering wheel is further worsened. This is due to the decrease of the self-aligning torque in the low μ road travel time, the influence of the increase of the friction further emerges relative to other factors.

As mentioned above, since the steer torque Ts changes when the friction of the mechanical components of the steering system increases, or when the road surface μ falls in the load based configuration as described above with reference to FIG. 4, the steering feel also changes as a result. Further, although not shown in FIG. 4, the self-aligning torque at a low speed travel time at a certain steer angle θ decreases from the self-aligning torque at a high speed travel time at the same steer angle θ, which leads to a change of the relationship between the steer angle θ and the steer torque Ts due to the influence of the friction that is relatively increased, among other factors. That is, the driver feels an undesirable change of the steering feel due to the increase of the friction of the steering system.

Now, a different configuration may be considered, as shown in the patent document 2, in which the steer angle based target steer torque Tid2 is used as the final target steer torque, and the difference between the steer angle based target steer torque Tid2 and the steer torque Ts is input to the servo controller 180, which is hereafter designated as a steer angle based configuration.

The steer angle based configuration may be considered as a configuration in which the target steer torque is determined without using friction affected factors. In such a configuration, the influence of the friction of the mechanical elements of the steering system on the target steer torque Tid or on the assist torque that is output from the motor 6 is removed.

Further, the target steer torque Tid determined based on the steer angle θ prevents a resisting torque to be generated in the steer-back operation that returns the steering wheel 2 back to the neutral position, resisting the returning of the steering wheel 2 in the operation along the path of an arrow A2 in FIG. 4.

However, due to a determination of the target steer torque Tid based on the steer angle θ, the change of the target steer torque Tid will not be caused when the friction coefficient between the road surface and the steered tire 10 changes, which leaves the driver uninformed about the road surface state, (i.e., the driver will have an "always-the-same" steering feel regardless of the state of the road surface.

That is, the information of the friction coefficient between the road surface and the steered tire 10 is no longer transmitted to the driver via steer torque Ts, thereby causing an uncomfortable steering feel for the driver, or making it difficult for the driver to grasp the vehicle state, such as a spin of the vehicle or the like, which means that the deterioration of the operability of the vehicle.

In addition to the above, although a road surface reaction force basically increases with an increase of a steered angle of the steered tire 10 (i.e., with an increase of the steer angle θ), the increase of the road surface reaction force according to the increase of the steer angle θ tends to be smaller as the steer angle θ increases.

For example, as shown in the graph with the solid line in FIG. 4, an inclination angle of the graph that decreases to be smaller in a portion of the steer angle θ of 5 degrees or more is caused partially by such tendency.

Further, when the friction (i.e., a grip force) between the steered tire 10 and the road surface is insufficient at the steered time, the steered tire 10 may slip against the road surface, converging the road surface reaction force acting from the road surface to the tire 10 to a certain constant value. The insufficient grip force situation may happen when the vehicle is traveling on the low μ road.

When the road surface reaction force is converging to a constant value, or has already converged, the estimated load Tx estimated by the load estimation part 110 also converges to a constant value. Thus, a situation in which the road surface reaction force and the estimated load Tx stay at constant values, or with a nominal increase regardless of the increase of the steer angle θ is designated as a saturation of the road surface reaction force.

As shown in the first quadrant of FIG. 4, during the steering-away operation and for a steer angle θ in a range of 5 degrees or more, the friction increases and the inclination of the graph in the low μ road travel becomes smaller than inclination in the normal time or in the friction increased time. This is caused by the insufficient grip force which is then causing the convergence of the road surface reaction force and the estimated load Tx.

When the estimated load Tx is saturated in the load based configuration, the load based target steer torque Tid1 determined according to the estimated load Tx after saturation and used as the final target steer torque will also saturate. That is, after the saturation of the load based target steer torque Tid1 at a certain steer angle θ, the steer-away operation of the steering wheel 2 is performable by the same steer torque by the driver.

Therefore, in the load based configuration, the driver is enabled to feel the road surface state and the like (e.g., a degree of the grip of the steered tire 10), based on a clue of whether the steer torque has already saturated or not, for example.

However, in the steer angle based configuration, due to the use of the steer angle based target steer torque Tid, which is determined according to the steer angle θ, as the final target steer torque, the target steer torque Tid increases as the steer angle θ increases, which means that there is no saturation of the target steer torque. That is, even when the road surface reaction force is already saturated in reality, the target steer torque Tid increases with an increase of the steer angle θ in the steer angle based configuration, thereby possibly causing an uncomfortable steering feel to the driver.

(Weighting Calculation Part 140)

As stated above, both of the load based configuration and the steer angle based configuration have trade-offs. Therefore, in the present embodiment, the weighting calculation part 140 determines the weighting ratio α according to the steering operation of the driver or the state of the road surface, and performs a weight-and-add calculation for the load based target steer torque Tid1 and the steer angle based target steer torque Tid2 with the weighting ratio α for calculating the target steer torque Tid. Hereafter, an example of the configuration of the weighting calculation part 140 is described.

Figure 5:
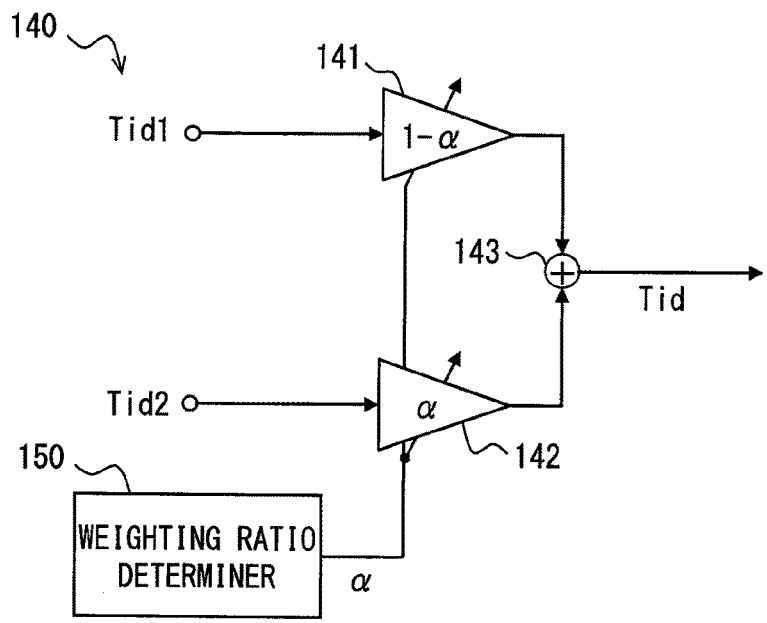
FIG. 5 is a block diagram of a weighting calculation part.

The weighting calculation part 140 is provided with a load based adjuster 141, a steer angle based adjuster 142, an adder 143, and the weighting ratio determiner 150 as shown in FIG. 5.

The load based adjuster 141 acquires the load based target steer torque Tid1 which is output from the load based target determination part 120, and inputs to the adder 143 a value which is derived by multiplying the load based target steer torque Tid1 by 1−α.

The steer angle based adjuster 142 acquires the steer angle based target steer torque Tid2 that is output from the steer angle based target determination part 130, and inputs to the adder 143 a value which is derived by multiplying the steer angle based target steer torque Tid2 by α.

The adder 143 adds the a-multiplied steer angle based target steer torque Tid2 to the (1−α)-multiplied load based target steer torque Tid1, and generates the target steer torque Tid. That is, the target steer torque Tid is represented by an (Equation 1) below. The target steer torque Tid generated in the above-described manner is input to the subtraction part 170.

$$Tid=(1-\alpha) \text{ and } Tid1+\alpha \cdot Tid2 \qquad \text{(Equation 1)}$$

Figure 6:
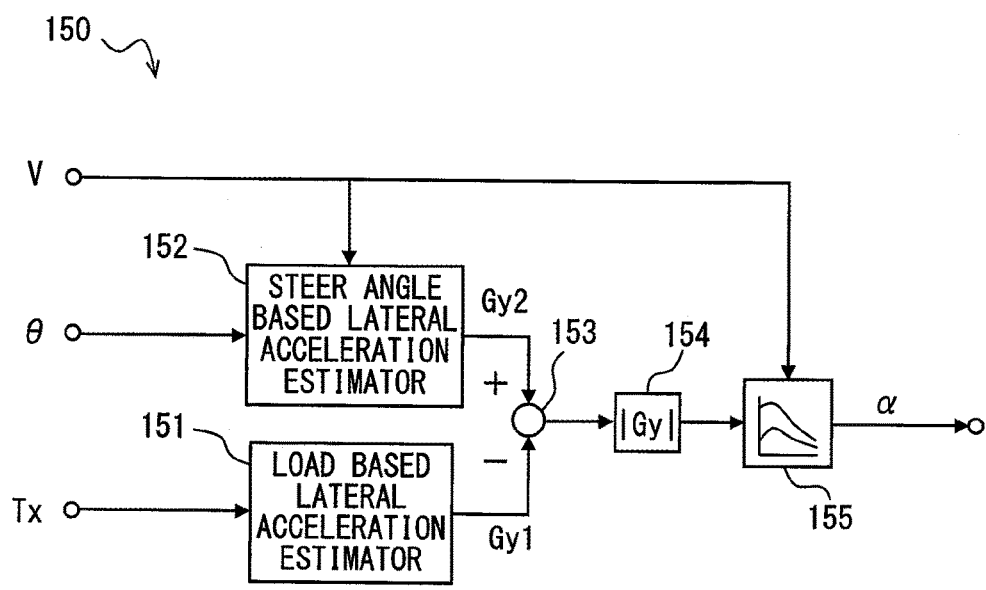
FIG. 6 is a block diagram of a weighting ratio determiner in the embodiment.

The weighting ratio determiner 150 determines the weighting ratio α, and outputs the ratio α to the load based adjuster 141 and to the steer angle based adjuster 142. An example of a configuration of the weighting ratio determiner 150 is shown in FIG. 6. The configuration of the weighting ratio determiner 150 is not limited only to the one shown in FIG. 6. Other configurations are later mentioned as each of modifications.

The weighting ratio determiner 150 in the present embodiment is provided with a load based lateral acceleration estimater 151, a steer angle based lateral acceleration estimater 152, a subtraction part 153, an absolute value generation part 154, and a weighting ratio generation part 155 as shown in FIG. 6.

The load based lateral acceleration estimater 151 estimates a lateral acceleration Gy1 by multiplying the estimated load Tx by a load-lateral acceleration scale factor Ktxg which is set in advance, which is the acceleration of the vehicle in the transverse direction, or a so-called side G.

The steer angle based lateral acceleration estimater 152 estimates a lateral acceleration Gy2 by multiplying the steer angle by a steer angle-lateral acceleration scale factor Kthg that is set in advance. In other words, the estimated lateral acceleration Gy2 is the acceleration of the vehicle in the transverse direction. The transverse direction here refers to a vehicle width direction.

Here, the calculation of the load-lateral acceleration scale factor Ktxg used by the load based lateral acceleration estimater 151, and the steer angle-lateral acceleration scale factor Kthg used by the steer angle based lateral acceleration estimater 152 is described.

First, the calculation method of the load-lateral acceleration scale factor Ktxg used by the load based lateral acceleration estimater 151 is described.

Figure 7A:
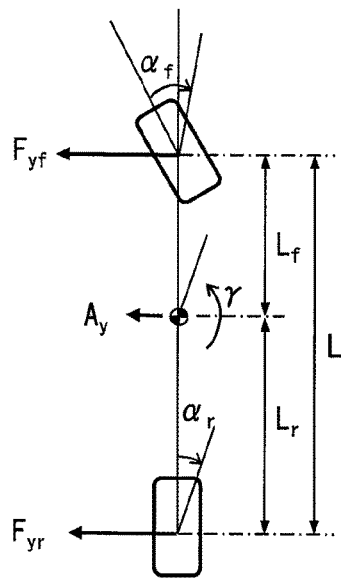
FIG. 7A is an illustrative diagram of a model used for calculation of a scale factor.

FIG. 7A shows a simplified model of a vehicle in which a front wheel is steered, and both (Equation 2) and (Equation 3) are obtained from the model in FIG. 7A.

$$I_z \cdot \gamma' = L_f \cdot F_{yf} - L_r \cdot F_{yr} \qquad \text{(Equation 2)}$$

$$M \cdot G_{y1} = F_{yf} + F_{yr} \qquad \text{(Equation 3)}$$

In the Equations 2 and 3, Iz is a yaw-inertia moment, γ is a yaw rate, γ' is a yaw-angular acceleration (which is a differentiation of the yaw rate), Lf is a distance between the front wheel and the center of gravity, Lr is a distance between the rear wheel and the center of gravity, Fyf and Fyr are respectively a lateral tire force generated at a tire slip angle of αf and αr, M is a vehicle weight, and Gy1 is a lateral acceleration (i.e., a side G). When a wheel base is defined as L (=Lf+Lr), the Fyr is erased from the Equations 2 and 3, an equation 4 is derived.

$$F_{yf} = \frac{I_z}{L} \gamma' + \frac{L_r}{L} M \cdot G_{y1} \qquad \text{(Equation 4)}$$

Figure 7B:
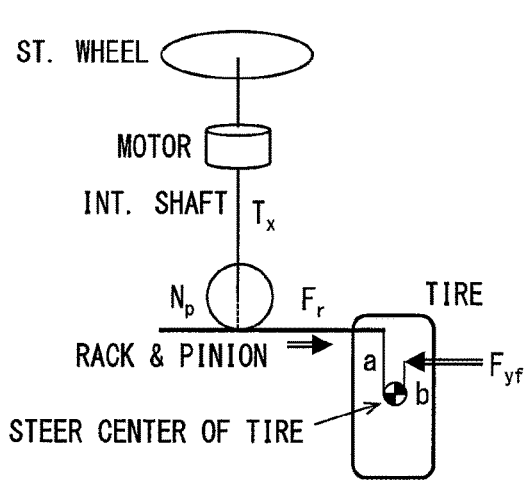
FIG. 7B is a model diagram of the connection through which a rotation of the steering wheel is transmitted to steer the steered wheel.

FIG. 7B is a model diagram of connection through which a rotation of the steering wheel is transmitted to steer the steered wheel 10. The load estimater 110 estimates the torque applied from the steering wheel 2 and from the motor 6 to the intermediate shaft 5 as the estimated load Tx.

The estimated load Tx rotates the pinion having a pinion radius Np. Thereby, the estimated load Tx is converted to a rack thrust Fr by the gear system having the rack and pinion gear, and is transmitted to the steered tire 10. That is, the estimated load Tx the pinion radius Np, and the rack thrust Fr fulfills a relationship represented by (Equation 5). The right and left tires are actually provided in a vehicle, which is in FIG. 7B simplified to only one tire 10.

According to the rack thrust Fr, a torque Fr·a that steers the tire 10 at a tire steer center is generated, and the lateral tire force Fyf is represented as a torque Fyf·b, which steers the tire 10 back to the neutral position at a center of road surface contact area of the tire 10 (i.e., as a self-aligning torque). In the above, 'a' represents a distance from the tire steer center to a point of action, 'b' is a distance from the tire steer center to the road surface (i.e., a road surface contact area of the tire 10).

The approximation of the above force and torque are represented by an equation 5 and an equation 6, which ignore the inertia and friction of the mechanical components, and ignore the change of the distances a and b.

$$F_r \cdot a = F_{yf} \cdot b \qquad \text{(Equation 5)}$$

$$T_x = N_P \cdot F_r \qquad \text{(Equation 6)}$$

Based on the equations 4 to 6, the lateral acceleration Gy1 is represented by the estimated load Tx in an equation 7.

$$G_{y1} = \frac{L \cdot a}{M \cdot N_P \cdot L_r \cdot b} \cdot T_x - \frac{I_z}{M \cdot L_r} \cdot \gamma' \qquad \text{(Equation 7)}$$

The second term on the right side of the equation 7 includes a yaw angular acceleration γ', which is a transitional term. Therefore, in a static view, this term γ' is ignorable. That is, when the second term on the right side of the equation 7 is ignored, the lateral acceleration Gy1 and the estimated load Tx have a proportional relationship. The constant of proportionality for calculating the lateral acceleration Gy1 based on the estimated load Tx is determined as the load-lateral acceleration scale factor Ktxg. That is, the load-lateral acceleration scale factor Ktxg is represented by an equation 8.

$$K_{txg} = \frac{L \cdot a}{M \cdot N_P \cdot L_r \cdot b} \quad \text{(Equation 8)}$$

The load-lateral acceleration scale factor Ktxg may be calculated based on the specification of the vehicle, or, if the specification is not available, may be derived from the measurements of the estimated load Tx and the lateral acceleration Gy1 picked up from the actual vehicle experiment (i.e., as an inclination angle of a linear graph regarding the measurement results).

Further, if the small dynamics are ignored, a relationship between the lateral acceleration Gy2 and the steer angle θ may be, in a static view, represented by an equation 9.

$$G_{y2} = \frac{V^2}{1 + K_s \cdot V^2} \cdot \frac{1}{N \cdot L} \cdot \theta \quad \text{(Equation 9)}$$

In the above, V is a vehicle speed, Ks is a stability factor, N is a steering-gear ratio, and L is a wheel base. Therefore, the steer angle-lateral acceleration scale factor Kthg for calculating the lateral acceleration Gy2 based on the steer angle θ is represented by an equation 10.

$$K_{thg} = \frac{V^2}{(1 + K_s \cdot V^2) \cdot N \cdot L} \quad \text{(Equation 10)}$$

The steer angle-lateral acceleration scale factor Kthg may be, just like the load-lateral acceleration scale factor Ktxg, calculated based on the specification of the vehicle, or, if the specification is not available, may be derived from the measurements of the steer angle θ, the vehicle speed V, and the lateral acceleration Gy2 picked up from the actual vehicle experiment (i.e., by formulating an approximate equation of the three variables and calculating with such an equation).

The subtraction part 153 subtracts the lateral acceleration Gy1, which is estimated by the load based lateral acceleration estimater 151, from the lateral acceleration Gy2, which is estimated by the steer angle based lateral acceleration estimater 152, and inputs the result of subtraction to the absolute value generation part 154 (i.e., input ΔG to the absolute value generation part 154). ΔG may be designated as a lateral acceleration deviation.

The absolute value generation part 154 calculates an absolute value of the lateral acceleration deviation ΔGy (i.e., a difference between the lateral acceleration Gy2 and the lateral acceleration Gy1, or a |ΔGy|).

The absolute value of the lateral acceleration deviation is equivalent to a steering system state indicator value, and the steer angle θ used by the steer angle based lateral acceleration estimater 152 for the estimation of the lateral acceleration Gy2 is equivalent a steer amount.

Figure 8:
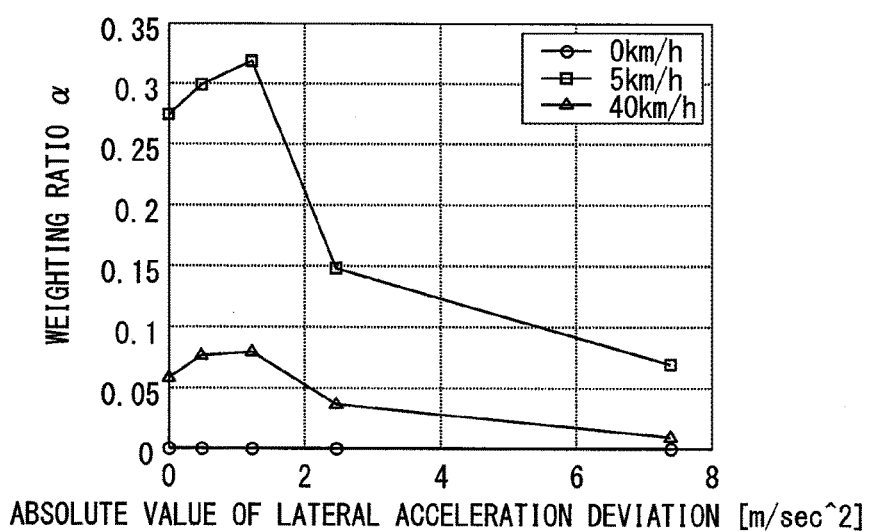
FIG. 8 is a graph of a weighting ratio generation map showing a relationship between a lateral acceleration deviation and a weighting ratio.

The weighting ratio generation part 155 has a weighting ratio map shown in FIG. 8, and generates the weighting ratio α from the absolute value of the vehicle speed V. which is detected by the speed sensor 12; and the lateral acceleration deviation, which is generated by the absolute value generation part 154. The weighting ratio map may be made as a map of the relationship between the absolute value of the lateral acceleration deviation, and the weighting ratio α for every vehicle speed of predetermined speed levels. The map in FIG. 8 shows such a relationship between the absolute value of the lateral acceleration deviation and the weighting ratio α for the vehicle speed V of 0 km/h, 5 km/h, and 40 km/h.

As shown in FIG. 8, in a region where the absolute value of the lateral acceleration deviation is small (e.g., a region of 0 to 1.2 m/sec^2), the weighting ratio α is set to have a relatively large value, when the vehicle speed V is greater than zero.

Further, in a region where the lateral acceleration deviation is greater than a preset value (i.e., 1.2 m/sec^2), the weighting ratio α is set to decrease as the lateral acceleration deviation increases. Further, the weighting ratio α for the vehicle speed V of 5 km/h is set to be greater than weighting ratio α for the vehicle speed V of 40 km/h.

As a basic policy of how the weighting ratio map is set up, the following factors are considered.

First, for the reduction of the influence of the friction of the mechanical components and for the improvement of the returnability of the steering wheel 2, the weighting factor α is set to a relatively large value, in view of the influence of the vehicle speed V. More practically, when the weighting factor α increases, the steer angle based target steer torque Tid2-derived component increases in the final target steer torques Tid, which means that the steering feel becomes closer to the one in the steer angle based configuration, and the returnability of the steering wheel 2 is improved.

However, if the weighting ratio α is increased too much, the load based target steer torque Tid1-derived component in the final target steer torques Tid becomes small, which spoils the steering feel. Therefore, the weighting ratio α is increased in a range in which, while reducing the influence of friction of the mechanical components of the steering system, the steering feel is not spoiled.

Further, when the steered tire 10 is not gripping the road surface, the tire 10 is slipping on the road surface, which allows the convergence of the road surface reaction force. Therefore, the target steer torque Tid is also saturated, preferably. Now, if the weighting ratio α in a slipping time, i.e., with an insufficient grip force, is set to be the same value as the weighting ratio α in a gripping time, i.e., when the tire 10 is not slipping, the load based target steer torque Tid1-derived component in the target steer torques Tid is overly suppressed, thereby making it difficult for the target steer torque Tid to be saturated.

Thus, the target steer torque Tid is set to be easily saturated by decreasing the weighting ratio α when the grip force of the steered tire 10 is insufficient. In response to the fact that the target steer torque Tid is saturated, the driver notices that the grip force of the steered tire 10 has converged to a certain fixed value, thereby having an improved steering feel.

Next, a relationship between the absolute value of the lateral acceleration deviation and the grip force of the steered tire 10 is described.

As mentioned above, when the grip force of the steered tire 10 is insufficient for the steering of the driver, the steered tire 10 slips on the road surface, and the desired steer result of the driver will not be achieved. The insufficient grip situation may be experienced, for example, when the vehicle is traveling on the low μ road.

When the grip force of the steered tire 10 is insufficient, the road surface reaction force acting on the steered tire 10 is saturated due to the slip of the steered tire 10, thereby allowing the convergence of the estimated load Tx converged to a certain fixed value. Therefore, when the grip force of the steered tire 10 is insufficient, the lateral acceleration Gy1 estimated from the estimated load Tx converges to the fixed value.

On the other hand, the lateral acceleration Gy2 estimated from the steer angle θ, which is free from the influence of the road surface load, is outputted as a value according to the steer angle θ.

In a situation in which the grip force is sufficient, the driver-desired steering result is achieved, which means that an expected lateral acceleration is generated for the steering of the driver, and the lateral acceleration deviation is relatively small.

However, when the grip force starts to be insufficient, the lateral acceleration expected for the steering of the driver will not be generated, and load based the lateral acceleration Gy1 and the steer angle based the lateral acceleration Gy2 start to deviate from each other (i.e., the lateral acceleration deviation starts to increase). That is, in a region in which the lateral acceleration deviation increases, the grip force of the steered tire 10 is insufficient and the driver-expected lateral acceleration expected for the steering of the driver is not generated.

Therefore, in a value range of the lateral acceleration deviation being relatively small, which is considered that the grip force of the steered tire 10 is sufficient, the weighting ratio α is set to a relatively large value for the reduction of the influence of the friction of the mechanical components of the steering system and for not spoiling the steering feel.

In the region which is considered that the grip force of the steered tire 10 is insufficient, on the other hand, the weighting ratio α is set to a relatively small value, so that the target steer torque Tid may easily be saturated.

Further, by setting the smaller weighting ratio α as the lateral acceleration deviation increases, the target steer torque Tid is easily saturated, which conveys a feedback to the driver, via steering feel sensed by the driver, that the degree of grip force is on the verge of insufficiency.

The threshold of the lateral acceleration deviation for the insufficient grip force of the steered tire 10 (i.e., a critical state) may be determined based on the experiment by the actual vehicle or the like. According to the present embodiment, the lateral acceleration deviation of 1.2 m/sec^2 is assumed to represent the critical state. The value representing the critical state is equivalent to a threshold.

Therefore, when the lateral acceleration deviation is set to 0 to 1.2 m/sec^2 in FIG. 8, it is assumed that the grip force of the steered tire 10 is sufficient, the weighting ratio α for the vehicle speed V of 5 km/h is set to a value of about 0.3, and the weighting ratio α for the vehicle speed V of 40 km/h is set to a value of about 0.08, based on the above-mentioned policy.

Further, in the region in which the lateral acceleration deviation is greater than predetermined value (i.e., 1.2 m/sec^2), it is assumed that the grip force of the steered tire 10 is insufficient, and the weighting ratio α is set to decrease as the lateral acceleration deviation increases.

Generally, at the low speed travel time (e.g., the vehicle speed V of 5 km/h), the self-aligning torque is small. That is, at the low speed travel time, the force which forces the steered tire 10 to return to the neutral position due to the friction of the road surface is weak.

Now, if the weighting ratio α is set to a small value, the load based target steer torque Tid1-derived component in the target steer torque Tid becomes large, and the mechanical friction influences more strongly to Tid. Therefore, the stability of the steering wheel is improved by increasing the weighting ratio α with a decrease of the vehicle speed V to a small value.

In the present embodiment, the relationship between the lateral acceleration deviation and the weighting ratio α is shown only for the vehicle speed V of 0 km/h, 5 km/h, and 40 km/h, the relationship for the other vehicle speed V may also be set as required.

For example, the weighting ratio α of the vehicle speed V of lower than 5 km/h (e.g., 3 km/h) is set to be greater than weighting ratio α for the vehicle speed V of 5 km/h, and the weighting ratio α of the vehicle speed V of higher than 5 km/h is set to be smaller than weighting ratio α for the vehicle speed V of 5 km/h. Further, the weighting ratio α for the vehicle speed V of higher than 40 km/h is set to be smaller than weighting ratio α for the vehicle speed V of 40 km/h. The weighting ratio α for the vehicle speeds other than one in the map may be set by an interpolation of the mapped value.

Here, the effects of the present embodiment are described with reference to FIG. 9.

Figure 9:
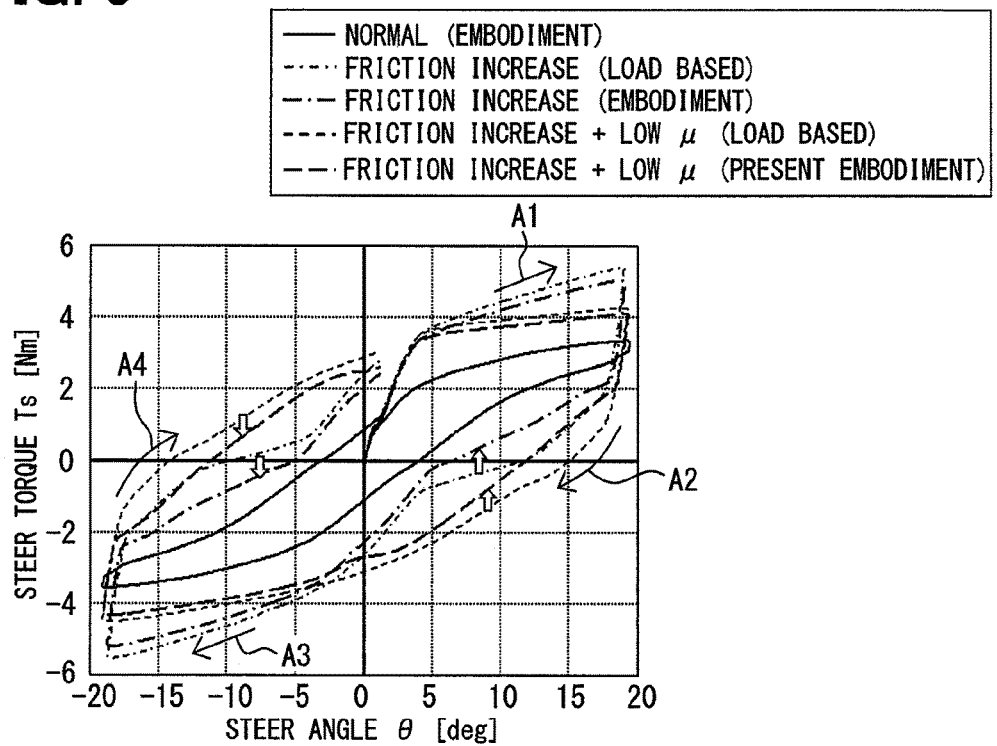
FIG. 9 is a graph of Lissajous wave forms of a relationship between a steer angle and a steer torque in the embodiment and in the load based configuration.

FIG. 9 is, similar to FIG. 4, a graph of the relationship between the steer angle θ and the steer torque Ts in the situation in which the steer angle θ is controlled to draw a sine curve along time.

In FIG. 9, the solid line, the one-dot long-dash line, and the long broken line are, respectively, the Lissajous wave form of the control that is performed by an input of the difference of the target steer torque Tid and the steer torque Ts that is generated by the weighting calculation part 140 (i.e., the input of the difference to the servo controller 180).

More specifically, the solid line represents the relationship between the steer angle θ and the steer torque Ts in the normal time, and the one-dot long-dash line represent the relationship between the steer angle θ and the steer torque Ts when the friction of the mechanical components of the steering system is greater than normal time. Further, the long broken line represents the relationship between the steer angle θ and the steer torque Ts when the friction of the mechanical components of the steering system is greater than normal time and the coefficient of friction μ of the road surface and the steered tire 10 is a relatively small value (i.e., μ=0.2).

Further, in FIG. 9, the one-dot short-dash line and the short broken line respectively represent the relationship between the steer angle θ and the steer torque Ts in the situation in which the steer angle θ is controlled to draw a sine curve along time. That is, the one-dot short-dash line and the short broken line of FIG. 9 are the same as the one-dot short-dash line and the short broken line of FIG. 4, respectively.

In the Lissajous wave form of the relationship between the steer angle θ and the steer torque Ts, the path in the fourth quadrant and in the second quadrant, which is an area of a positive steer angle θ and a negative steer torque Ts, and an area of a negative steer angle θ and a positive steer torque Ts, respectively, represents a situation in which a resisting torque Ts that resists the returning of the steering wheel 2 to the neutral position of 0 degree is generated.

That is, in such a situation, the driver needs to apply a torque Ts in a returning direction to forcefully return the steering wheel 2 to the neutral position.

First, the effects of the present embodiment over the load based configuration in a friction increased situation are described based on a comparison between the one-dot short-dash line and the one-dot long-dash line.

When the control of the present embodiment is preformed based on the target steer torque Tid that is generated by the weighting-and-addition of the load based target steer torque Tid1 and the steer angle based target steer torque Tid2, the resisting torque Ts that resists the returning of the steering wheel 2 to the neutral position of 0 degree is decreased, as readily seen as the path along an arrow A2 and an arrow A4.

For example, the steering operation along the arrow A2 represents a leftward rotation operation of the steering wheel 2 (i.e., the returning of the wheel 2 from the right to the neutral position). In general, for smoothly returning the steering wheel 2 to the neutral position from the right, the steer torque Ts during such a return time from the right to the neutral position may preferably be a value of 0 or a slightly positive value.

However, in the one-dot short-dash line, in the region in which the steer angle θ is 12 degrees or less, the steer torque Ts is a negative value, and the steer torque Ts is resisting the returning operation of the steering wheel 2. That is, the driver needs to apply a force in the return direction for the returning of the steering wheel 2 to the neutral position, while the steering wheel 2 returns from the position of the steer angle θ of 12 degrees to the neutral position.

On the other hand, a portion of the Lissajous wave form in the one-dot long-dash line passing in the fourth quadrant is decreased in comparison to the one-dot short-dash line.

More specifically, in the steering operation that returns the steering wheel 2 to the neutral position from the right, the steer torque Ts of negative value appears in a range of the steer angle θ of 6 degrees or less. Therefore, as described in the present embodiment, when the final target steer torque Tid is configured to include not only the load based target steer torque Tid1-drived component but the steer angle based target steer torque Tid2-derived component, the influence of the mechanical friction is reduced and the steering wheel 2 is smoothly returned to the neutral position.

Further, based on the comparison between the long broken line and the short broken line, even in a situation in which the friction of the machine element friction increases and the vehicle is traveling on the low μ road, the resisting torque Ts that resists the returning of the steering wheel 2 to the neutral position from the right is reduced according to the configuration of the present embodiment.

Further, in the steer-away operation of the steering wheel 2 along an arrow A1, which increases the steer angle θ to have a positive value, the steer torque Ts is saturated in a region of steer angle θ of 4 degrees or more, as shown in the long broken line as well as shown in the short broken line of the load based configuration. Therefore, according to the present embodiment, based on the saturation of the steer torque Ts, the driver can recognize that the road surface load is converging to a certain fixed value, or has converged thereto.

Next, the effects of the present disclosure in terms of the steering feel of the driver are described in a spin situation of the vehicle, to which the driver of the vehicle likely applies a counter-steer, with reference to the load based configuration and the steer angle based configuration.

First, in the steer angle based configuration, the target steer torque (i.e., the steer angle based target steer torque Tid2) is generated based on the steer angle θ, a returning torque along a returning direction of returning the steering wheel 2 to the neutral position is always generated. Therefore, in the steer angle based configuration, at the time of applying a counter-steer for controlling a spin, the driver feels a steer-back torque that returns the steering wheel 2 back to the neutral position not only in a steer-back time for returning the steering wheel 2 toward the neutral position but also in a steer-away time for steering the wheel 2 away from the neutral position to the other extreme end of the steerable range.

However, during the spin of the vehicle, the steered tire 10 receives a self-aligning torque in a vehicle flowing direction along which the vehicle is currently slipping/flowing while a spinning by itself (i.e., a torque orienting the tire 10 in such a direction). Therefore, based on the self-aligning torque described above, the driver in the spinning vehicle feels a reaction force in the vehicle flowing direction (i.e., along a tire flowing direction, or as described in more detail, in the steer-away time for steering the wheel 2 away from the neutral position).

Therefore, in the steer angle based configuration, the driver feels a torque that is unnatural in the counter-steer in terms of controlling and stopping the spin of the vehicle, which may make the driver uncomfortable or uneasy, and may prevent an appropriate counter-steer of the steering wheel 2.

On the other hand, in the load based configuration, the final target steer torque is generated as the load based target steer torque Tid1 based on the estimated load Tx, which is a torque returning the tire 10 toward a vehicle flowing direction. Therefore, in the spin time, the driver is enabled to naturally steer the wheel 2 in the spin-stopping direction.

In view of the above configurations, the weighting ratio α in the present embodiment is preferably configured to increase the Tdi1 component in the target steer torque Tid (i.e., by the decrease of the value α), for the ease of the counter-steer by the driver in the vehicle spin time. In other words, when the driver applies a counter-steer in the vehicle spin time, the smaller the difference between the target steer torque Tid and the load based target steer torque Tid1 is, the better.

Figure 10:
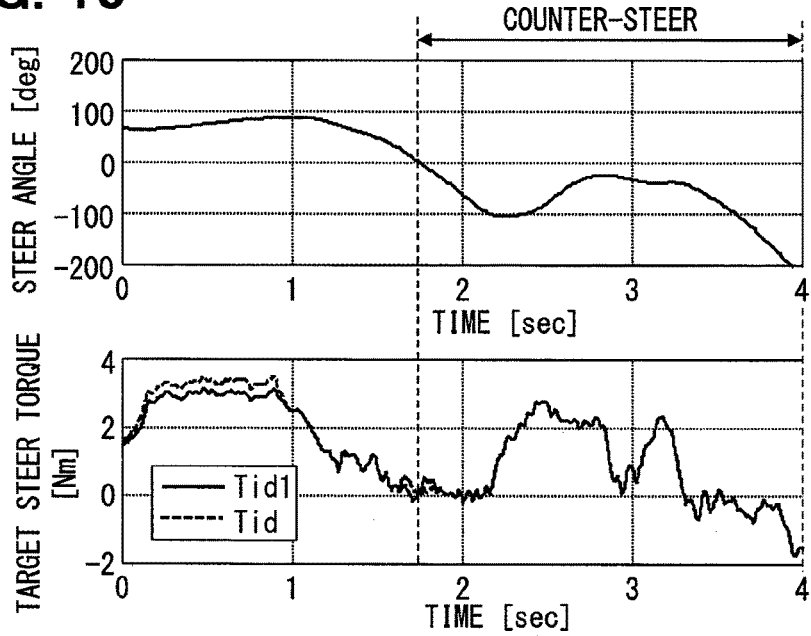
FIG. 10 is a time chart of the steer angle, a load based target steer torque, and a weighted target steer torque in a counter-steer situation for coping with a vehicle spin behavior concerning the embodiment.

FIG. 10 is a time chart of the steer angle θ and other measurements from the experiment in the vehicle spin time on a low μ road (i.e., when the driver applies a counter-steer) according to the present embodiment.

The data shows a time-charted steer angle θ in an upper diagram of FIG. 10, and a time-charted torque of load based target steer torque Tid1 and Tid in a lower diagram of FIG. 10.

As shown in FIG. 10, in the present embodiment, the target steer torque Tid follows the load based target steer torque Tid1. That is, in the present embodiment, the driver applies a counter-steer with ease (i.e., without becoming uncomfortable), in the vehicle spin time.

The reason why such an ease is realized is described in the following. That is, due to the saturation of the estimated load Tx to a relatively small value at the time of the spin, the lateral acceleration Gy1 generated based on the estimated load Tx is also saturated to a small value. On the other hand, the lateral acceleration Gy2 generated based on the steer angle θ, which is input as a relatively large value, increase to a large value. Therefore, the lateral acceleration deviation takes a larger value than one in a no spin time.

Since the lateral acceleration deviation takes a relatively large value, the weighting ratio generation part 155 outputs a relatively small weighting ratio α based on the weighting ratio generation map. That is, in a situation of applying a counter-steer to the spin, the target steer torque Tid in the present embodiment takes a value that is very close to the load based target steer torque Tid1 (i.e., a substantially same value).

Therefore, the weighting ratio generation map may be configured to output a relatively small weighting ratio α in a region in which the spin may likely be caused (i.e., where the lateral acceleration is relatively large). In such manner, discomfort to the driver is reduced when applying a countersteer to the spin of the vehicle.

As mentioned above, according to the present embodiment, in the subtraction part 170 and in the servo controller 180, based on the torque deviation ΔT, which is a deviation of the target steer torque Tid and the steer torque Ts, the assist torque instruction value Ta* is determined.

Further, the target steer torque Tid is determined by weighting the load based target steer torque Tid1 determined based on the estimated load Tx and the steer angle based target steer torque Tid2 determined based on the steer angle θ and by adding the weighted load based target steer torque Tid1 and the weighted steer angle based target steer torque Tid2. More practically, the sum of the target steer torque Tid multiplied by the ratio α and the steer angle based target steer torque Tid2 multiplied by (1−α) is determined as the final target steer torque Tid.

The friction of the mechanical components of the steering system increases the estimated load Tx, and thereby increases the load based target steer torque Tid1 and the steer torque Ts as a result.

Although the influence of the mechanical friction appears in one component of Tid (i.e., in the load based target steer torque Tid1), the target steer torque Tid includes a steer angle based target steer torque Tid2-derived component which is free from the influence of the friction. That is, the friction influence is moderated by steer angle based target steer torque Tid2, and the returnability of the steering wheel 2 is improved.

Further, due to the load based target steer torque Tid1-derived component in the target steer torque Tid, the driver is enabled to catch the information such as a road surface reaction force and the like based on the steering feel. In other words, while improving the returnability of the steering wheel 2 to the neutral position, the steering feel is kept unchanged in the present embodiment.

Although an embodiment of the present disclosure is described above, the present disclosure is not necessarily limited to the above-mentioned embodiment, which means that the present disclosure may take various forms and modification, as long as the gist of the disclosure is kept unchanged.

<Modification 1>

According to the embodiment mentioned above, the weighting ratio α is determined based on the lateral acceleration deviation ΔGy.

The electric power steering system 1 in a modification 1 has a weighting ratio determiner 250 which determines the weighting ratio α based on a product of the steer angle θ and the estimated load Tx, replacing the weighting ratio determiner 150 in the above embodiment.

The other components other than weighting ratio determiner 250 are the same as the one in the above-described embodiment. Further, based on the weighting ratio α, which is determined by the weighting ratio determiner 250 of the modification 1, the weighting calculation part 140 performs a weighting and an addition of the load based target steer torque Tid1 and the steer angle based target steer torque Tid2, and generates the target steer torque Tid.

Figure 11:
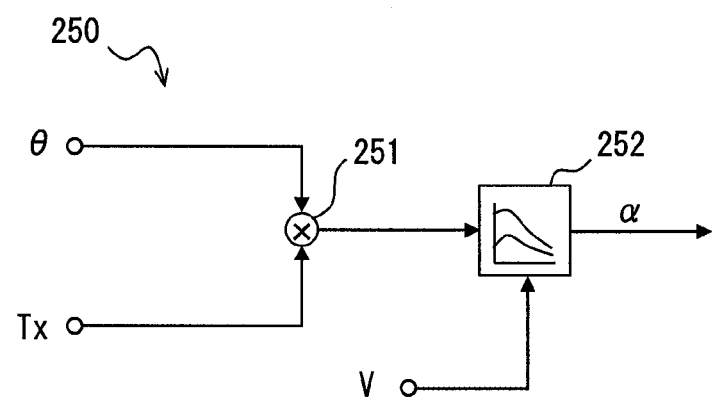
FIG. 11 is a block diagram of the weighting ratio determiner in a modification 1 of the embodiment.

The weighting ratio determiner 250 of the modification 1 is provided with a multiplier 251 and a weighting ratio generation part 252 as shown in FIG. 11.

The multiplier 251 receives an input of the steer angle θ which is detected by the steer angle sensor 11 and the estimated load Tx which is estimated by the load estimater 110, and outputs a value which is derived from the multiplication of the steer angle θ and the estimated load Tx (i.e., a steer angle-load multiplication value) to the weighting ratio generation part 252.

The steer angle-load multiplication value is equivalent to an example of the steering system state indicator value, and the steer angle θ currently used to calculate the steer angle-load multiplication value is equivalent to a steer amount given.

Here, for the ease of calculation, the steer angle-load multiplication value is calculated as a value in which a unit of the steer angle θ is converted to radians (rad.) from degrees (deg.). Therefore, a unit of the steer angle-load multiplication value is represented with Nm·rad. Alternatively, the steer angle θ may be used as a value in a unit of deg.

Figure 12:
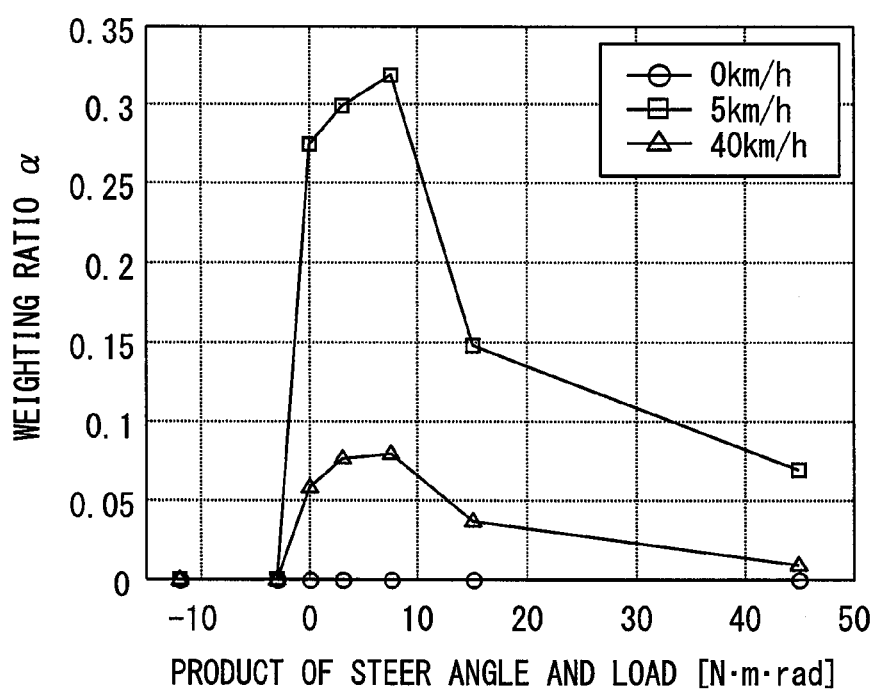
FIG. 12 is a graph of the weighting ratio generation map of a relationship between (i) a product of the steer angle and the load and (ii) the weighting ratio.

The weighting ratio generation part 252 is provided with the weighting ratio map shown in FIG. 12, and generates the weighting ratio α based on the vehicle speed V detected by the speed sensor 12 and the steer angle-load multiplication value inputted from the multiplier 251.

The weighting ratio map is a map of data, which illustrates a relationship between the steer angle-load multiplication value and the weighting ratio α for the vehicle speeds of various levels. Here, the relationship between the steer angle-load multiplication value and the weighting ratio α is mapped for the vehicle speed V of 0 km/h, 5 km/h, and 40 km/h, respectively.

As shown in FIG. 12, at the vehicle speed V of greater than 0 km/h, the weighting ratio α in a small region (i.e., a region in which the steer angle-load multiplication value takes a positive value and is relatively small (e.g., a region of 0 to 8 Nm·rad)), is set to have a relatively large value.

In a region greater than above (i.e., a region of 8 Nm·rad or greater), the weighting ratio α is set to increase as the steer angle-load multiplication value increases.

Further, the weighting ratio α at the vehicle speed V of 5 km/h is set to be greater than weighting ratio α at the vehicle speed V of 40 km/h in the above-described embodiment.

The design policy of the weighting map is the same as that of the weighting ratio map of the weighting ratio generation part 155 in the above-described embodiment. That is, the weighting ratio α is set according to the steer angle-load multiplication value for reducing the influence of the friction by the mechanical components of the steering system, and for not spoiling the steering feel in case that the grip force of the steered tire 10 is insufficient (e.g., in the low μ road travel time).

More practically, when the grip force of the steered tire 10 is insufficient, it is likely that a steering reaction suitably reflecting the steer angle θ is hard to be obtained in comparison to the normal time. Therefore, the driver tends to input a greater-than-usual steer angle θ for achieving the desired travel path (i.e., a trajectory) of the vehicle. The steering reaction here refers to a change of the travel direction according to the steer angle θ at a travel direction changing time of the vehicle. Further, when a larger steer angle θ is input, a larger road surface reaction force is generated, which saturates to a certain value. When the road surface reaction force is saturated, the estimated load Tx is also saturated.

That is, when the grip force of the steered tire 10 is insufficient, the steer angle-load multiplication value takes a relatively large value. Therefore, the target steer torque Tid is made to be easily saturable by setting the weighting ratio α to a small value in a region in which the steer angle-load multiplication value takes a relatively large value. In response to the saturation of the target steer torque Tid, the driver can recognize that the grip force of the steered tire 10 has converged to a fixed value, which improves the steering feel.

The threshold of the steer angle-load multiplication value for the critical state (i.e., when the grip force of the steered tire 10 falls to an insufficient level) may be determined by the road experiment or the like, which is in this case set to the steer angle-load multiplication value of 8 Nm·rad for such a critical state.

That is, when the steer angle-load multiplication value is within a range of 0 to 8 Nm·rad, the weighting ratio α is set based on an assumption that the grip force of the steered tire 10 is sufficient, and when the steer angle-load multiplication value is greater than 8 Nm·rad, the weighting ratio α is set based on an assumption that the grip force of the steered tire 10 is insufficient.

Further, when the steer angle-load multiplication value is large, which suggests that the degree of insufficiency of the grip force of the steered tire 10 is high for the steering of the driver, the weighting ratio α is set to a smaller value. In such manner, the target steer torque Tid is easily saturable.

Here, the effects of the modification 1 are described with reference to FIG. 13.

Figure 13:
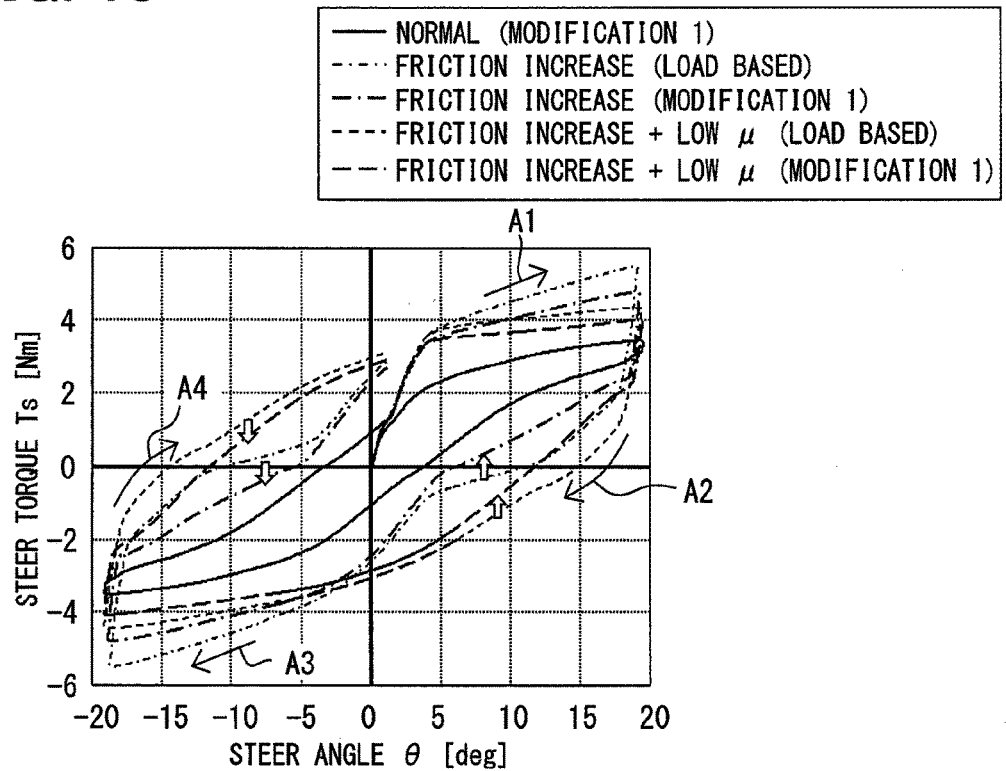
FIG. 13 is a graph of Lissajous wave forms of a relationship between the steer angle and the steer torque in the modification 1 and in the load based configuration.

FIG. 13 corresponds to FIG. 9, which is used for the description of the above embodiment.

Therefore, in FIG. 13, the solid line, the one-dot long-dash line, and the long broken line respectively draw the Lissajous wave form at the time of inputting, to the subtraction part 170, the target steer torque Tid generated based on the weighting ratio α which is generated by the weighting ratio determiner 250 of the modification 1, for the control of the steering. The other elements are the same as that of FIG. 9, thereby leaving the description thereof to the above embodiment.

First, based on the comparison between the one-dot short-dash line and the one-dot long-dash line, the configuration of the modification 1 is understood as reducing the resisting torque Ts that resists the returning of the steering wheel 2 to the neutral position of 0 degree steer angle, at the positions of an arrow A2 and an arrow A4, which is a steer angle decreasing situation toward 0 degree.

For example, the steering operation in a direction along the arrow A2 represents the leftward rotation operation of returning the steering wheel 2 to the neutral position from the right.

In the one-dot short-dash line, in the region in which the steer angle θ is 12 degrees or less, the steer torque Ts is a negative value, and the steer torque Ts is resisting the returning operation of the steering wheel 2. That is, the driver needs to apply a force in the return direction for the returning of the steering wheel 2 to the neutral position, while the steering wheel 2 returns from the position of the steer angle θ of 12 degrees to the neutral position.

On the other hand, a portion of the Lissajous wave form in the one-dot long-dash line passing in the fourth quadrant is decreased in comparison to the one-dot short-dash line.

More specifically, in the steering operation that returns the steering wheel 2 to the neutral position from the right, the steer torque Ts of negative value appears in a range of the steer angle θ of 6 degrees or less. Therefore, in the modification 1, just like the above-described embodiment, the influence of the mechanical friction is reduced, and the steering wheel 2 is smoothly returned to the neutral position.

Further, based on the comparison between the long broken line and the short broken line, even in a situation in which the friction of the machine element friction increases and the vehicle is traveling on the low μ road, the resisting torque Ts that resists the returning of the steering wheel 2 to the neutral position from the right is reduced according to the configuration of the modification 1.

Further, in the steer-away operation of the steering wheel 2 along an arrow A1, which increases the steer angle θ to have a positive value, the steer torque Ts is saturated in a region of steer angle θ of 4 degrees or more, as shown in the long broken line as well as shown in the short broken line of the load based configuration. Therefore, according to the modification 1, based on the saturation of the steer torque Ts, the driver can recognize that the road surface load is converging to a certain fixed value, or has converged thereto.

Next, the effects of the configuration of the modification 1 in terms of the steering feel of the driver at the time of applying the counter-steer for the spin of the vehicle are described. As mentioned before, when the driver applies a counter-steer for the spin of the vehicle, the smaller the difference between the target steer torque Tid and the load based target steer torque Tid1 is, the better.

Figure 14:
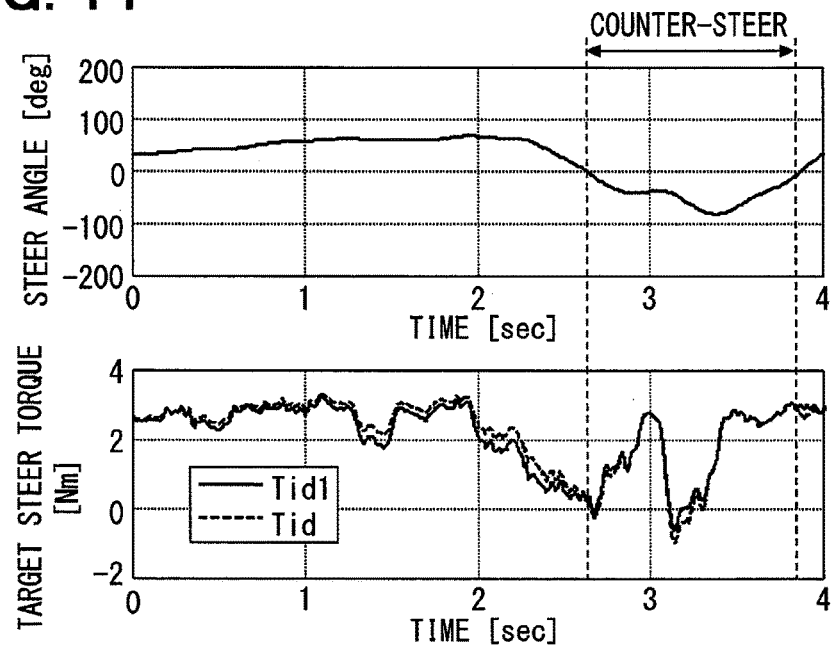
FIG. 14 is a time chart of the steer angle, a load based target steer torque, and a weighted target steer torque in a counter-steer situation for coping with a vehicle spin behavior concerning the modification 1.

FIG. 14 corresponds to FIG. 10 used in the description of the embodiment, illustrating the test data of applying the counter-steer to the spin of the vehicle in the configuration of the modification 1 in the low μ road travel time.

As shown in FIG. 14, in the configuration of the modification 1, the target steer torque Tid follows the load based target steer torque Tid1. That is, the driver is enabled to apply the counter-steer comfortably to the spin of the vehicle also in the modification 1.

This is because of the configuration of the modification 1 operating in the following manner. That is, in the vehicle spin time, the steer angle θ and the estimated load Tx take respectively different signs of plus and minus (i.e., + and −), indicating that the steering direction and the estimated load direction is opposite to each other, thereby resulting in a negative steer angle-load multiplication value.

Here, in the modification 1, the weighting ratio α for the negative value range of the steer angle-load multiplication value is set to a small value (i.e., 0 in this case) as shown in FIG. 12. Therefore, in a counter-steer application situation for the spin of the vehicle, the target steer torque Tid according to the configuration of the modification 1 takes a value that is close to the load based target steer torque Tid1 (i.e., takes a substantially same value in this case).

In other words, the weighting ratio generation map may be configured to output a relatively small weighting ratio α in a region in which the spin may likely be caused (i.e., where the steer angle-load multiplication value takes a negative value). In such manner, discomfort to the driver is reduced when applying a counter-steer to the spin of the vehicle.

As mentioned above, according to the modification 1, the same effects as the above-mentioned embodiment is achieved. That is, according to the configuration in the modification 1, while improving the returnability of the steering wheel 2 to the neutral position, the driver is prevented from becoming agitated or from experiencing an unnatural steering feel.

<Modification 2>

The electric power steering system 1 of the modification 2 may have, in place of the weighting ratio determiner 150, a weighting ratio determiner 350 which determines the weighting ratio α based on a product of an angular velocity ω which is derived by a differentiation of the steer angle θ and the steer torque Ts which is detected by the torque sensor 4.

Figure 15:
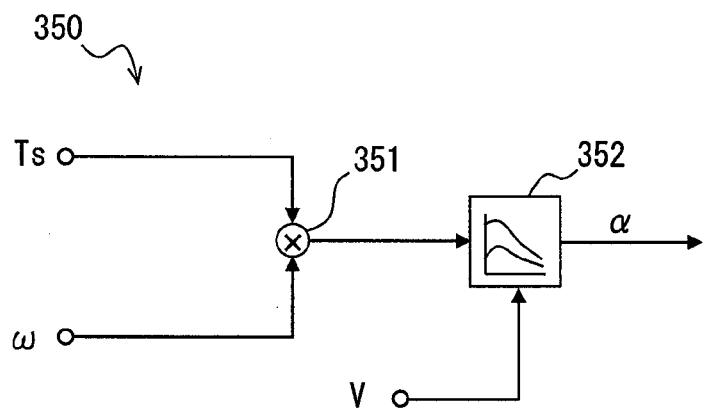
FIG. 15 is a block diagram of a weighting ratio determiner in a modification 2 of the embodiment.

The weighting ratio determiner 350 of the modification 2 is provided with a multiplier 351 and a weighting ratio generation part 352 as shown in FIG. 15.

The multiplier 351 receives an input of the angular velocity w which is a time differentiation of the steer angle θ which is detected by the steer angle sensor 11 and the steer torque Ts which is detected by the torque sensor 4, and outputs a value derived from the multiplication of the angular velocity w and the steer torque Ts (i.e., a steering speed-steer torque multiplication value) to the weighting ratio generation part 352.

The steering speed-steer torque multiplication value is equivalent to an example of the steering system state indicator value, and each of the angular velocity and the steer torque is equivalent to a steer amount.

Figure 16:
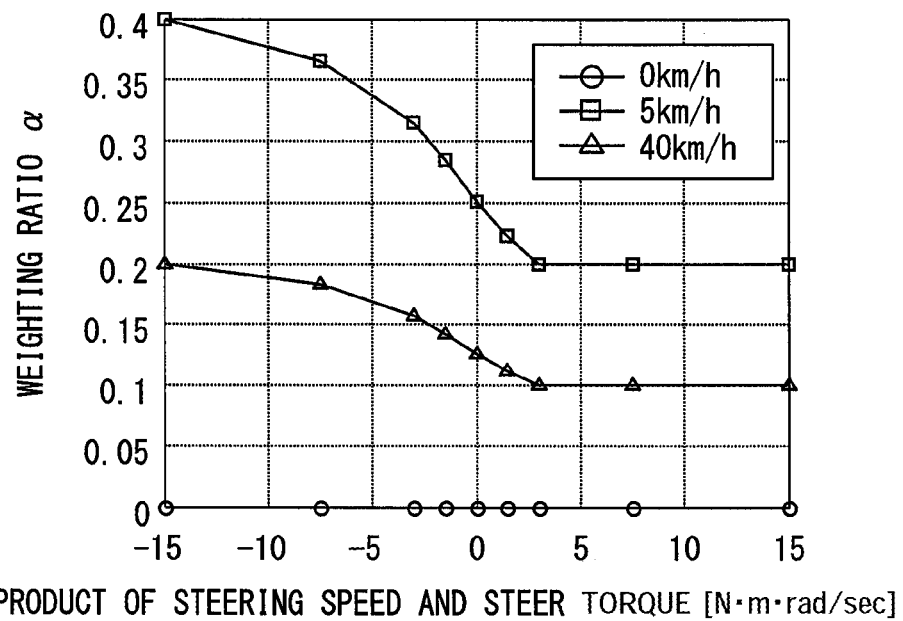
FIG. 16 is a graph of the weighting ratio generation map showing a relationship between (i) a product of a steering speed and the steer torque and (ii) the weighting ratio.

The weighting ratio generation part 352 in the modification 2 is provided with a weighting ratio map shown in FIG. 16, and generates the weighting ratio α based on the vehicle speed V detected by the speed sensor 12 and the steering speed-steer torque multiplication value inputted from the multiplier 351.

The weighting ratio map is a map of data, which maps as a graph of a relationship between the steering speed-steer torque multiplication value inputted and the weighting ratio α for the vehicle speeds of various levels. Here, the relationship between the steering speed-steer torque multiplication value and the weighting ratio α is mapped for the vehicle speed V of 0 km/h, 5 km/h, and 40 km/h, respectively.

As shown in FIG. 16, at the vehicle speed V of greater than 0 km/h, the relationship between the steering speed-steer torque multiplication value and the weighting ratio α is configured in the following manner. That is, the weighting ratio α in a positive value region of the steering speed-steer torque multiplication value is configured to be greater than weighting ratio α in a negative value region of the steering speed-steer torque multiplication value.

In the modification 2, the steer-back operation, in which the returnability of the steering wheel 2 is at issue, is distinguishable based on the sign of the steering speed-steer torque multiplication value. For example, during the steering operation of steering the wheel 2 from the neutral position to the right, the steer angle θ increases as a positive value, thereby causing the angular velocity ω to take a positive value. Further, when the steering operation of steering the wheel 2 from the neutral position to the right, the steer torque Ts is outputted as a positive value, thereby resulting in the steering speed-steer torque multiplication value also taking a positive value.

On the other hand, after the end of the rightward steering operation (i.e., in a situation in which the steer-back operation is started for returning the steering wheel 2 from a rightward-steered position (i.e., more precisely, a steer-away ending position in the steering operation to the right) toward the neutral position), while the steer torque Ts takes a positive value, the steer angle θ decreases to 0 and further (i.e., decreases to have a negative value).

Therefore, in a process of returning from the rightward-steered position to the neutral position, while the steer torque Ts takes a positive value, the steering speed-steer torque multiplication value takes a negative value.

Therefore, by setting the weighting ratio α to a large value in a region in which the steering speed-steer torque multiplication value takes a negative value, the load based target steer torque Tid1-derived component in the target steer torque Tid is reduced for the steer-back operation of the steering wheel 2, thereby reducing the influence of the friction of the mechanical components of the steering system. That is, the returnability of the steering wheel 2 at the time of returning toward the neutral position (i.e., in the steer-back operation) is improved.

In the above, the operation of the steering wheel 2 is described as a combination of a steer-away from the neutral position to the right followed by a steer-back from the right by the leftward rotation. However, the same effects are achieved by the reversed operation, in which the steering wheel 2 is steered to the left in the first place, then steered back from the left by the rightward rotation. The steering operation of the driver on a steering member for making the steer angle θ to have a small value indicates the steer-back operation.

The reason for setting a greater weighting ratio α for the vehicle speed V of 5 km/h in comparison to the weighting ratio α for the vehicle speed V of 40 km/h in the weighting ratio map is already mentioned in the above-described embodiment.

Here, the effects of the modification 2 are described with reference to FIG. 17.

Figure 17:
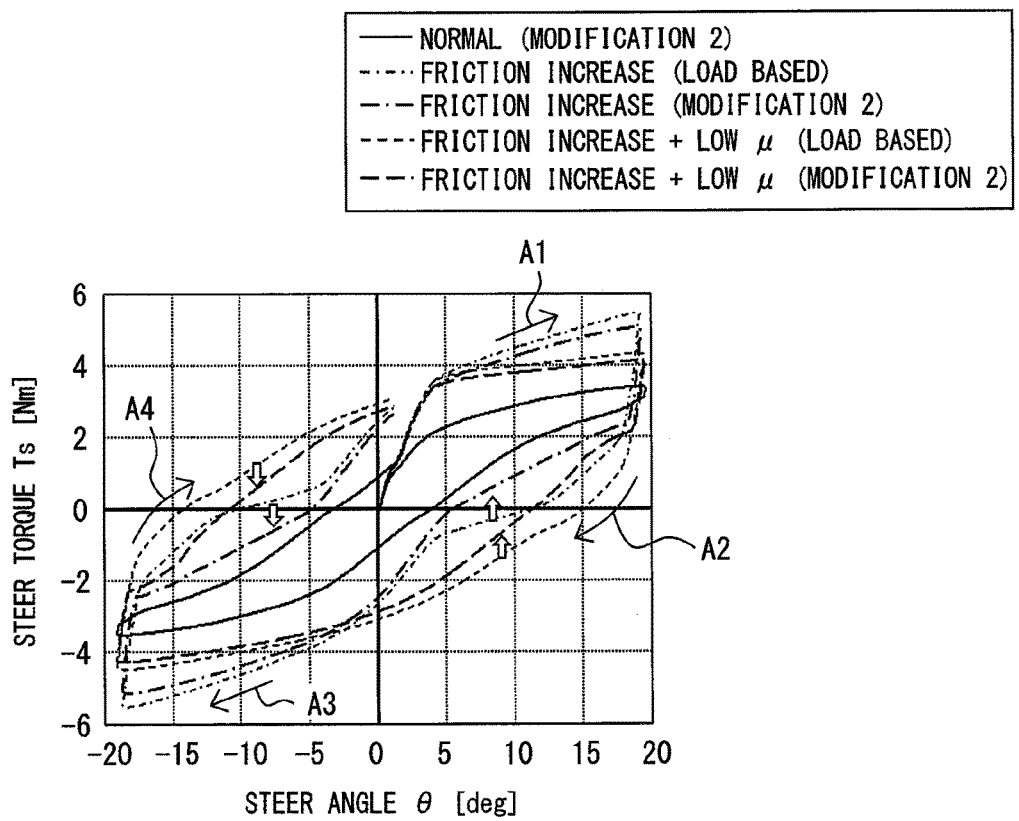
FIG. 17 is a graph of Lissajous wave forms of a relationship between the steer angle and the steer torque in a modification 2 and in the load based configuration.

FIG. 17 corresponds to FIG. 9 which is used for the description of the above embodiment.

That is, in FIG. 13, the solid line, the one-dot long-dash line, and the long broken line respectively draw the Lissajous wave form at the time of inputting, to the subtraction part 170, the target steer torque Tid generated based on the weighting ratio α, which is generated by the weighting ratio determiner 350 of the modification 2, for the control of the steering.

The same effects as the above-described embodiment and the modification 1 are achieved according to the modification 2 which is readily seen and is understandable from FIG. 17.

The steer-back state refers to a state of rotating the steering wheel in the same direction as an application direction of the self-aligning torque, which may be the steer-back operation. The steer-back state may also include, beside including the steer-back operation, a state in which the driver rotates the steering wheel 2 to steer/orient the tire to the vehicle flowing direction in the vehicle spin time.

Further, according to the configuration of the modification 2, while achieving the above-mentioned effects by designing the weighting ratio map based on the various test results etc., the driver's discomfort in performing a counter-steer for the control of the vehicle spin is reduced.

<The Modification 3>

According to the modification 3, the electric power steering system 1 is provided with a weighting ratio determiner 450 that determines the weighting ratio α based on the estimated load Tx, replacing the weighting ratio determiner 150.

Figure 18:
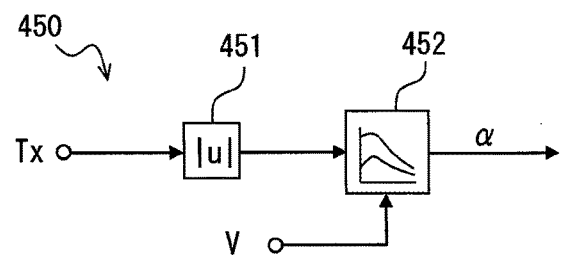
FIG. 18 is a block diagram of the weighting ratio determiner in a modification 3 of the embodiment.

The weighting ratio determiner 450 of the modification 3 is provided with an absolute value generation part 451 and a weighting ratio generation part 452 as shown in FIG. 18.

The absolute value generation part 451 receives an input of the estimated load Tx which is generated by the load estimater 110, generates an absolute value of the estimated load Tx, and outputs the value to the weighting ratio generation part 452.

The absolute value of the estimated load Tx is equivalent to a steering system state indicator value.

Figure 19:
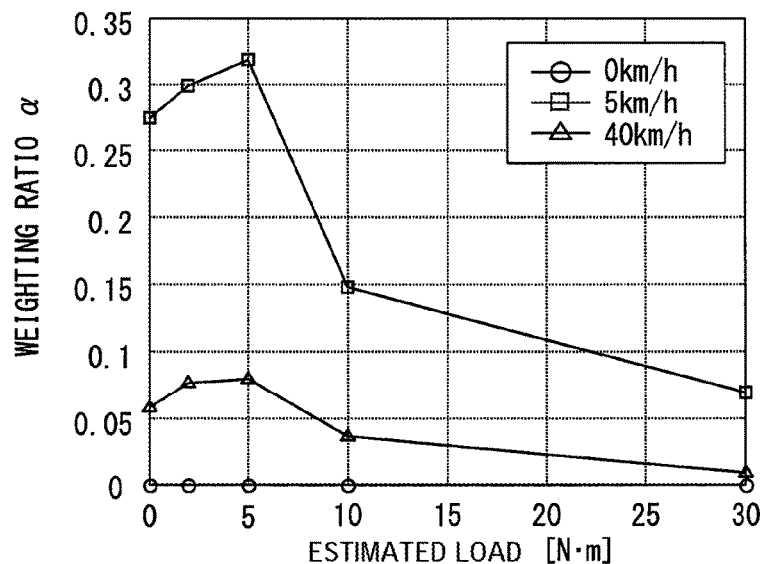
FIG. 19 is a graph of the weighting ratio generation map of a relationship between an estimated load and the weighting ratio.

The weighting ratio generation part 452 of the modification 3 is provided with a weighting ratio map shown FIG. 19, and generates the weighting ratio α based on the absolute value of the estimated load Tx inputted from the absolute value generation part 451 and the vehicle speed V which is detected by the speed sensor 12.

The weighting ratio map is a map of data, which maps as a graph of a relationship between the absolute value of the estimated load Tx and the weighting ratio α for the vehicle speeds of various levels. Here, the map provides a graph of relationship between the estimated load Tx and the weighting ratio α for the vehicle speed V of 0 km/h, 5 km/h, and 40 km/h.

As shown in FIG. 19, at the vehicle speed V of greater than 0, the relationship between the absolute value of the estimated load Tx and the weighting ratio α is configured in the following manner. That is, the weighting ratio α set to have a decrease trend as the absolute value of the estimated load Tx increases, when the absolute value of the estimated load Tx is equal to or greater than a preset value, or in this case 5 Nm. Further, the weighting ratio α is set to have a relatively large value for a relatively small value range of the estimated load Tx (e.g., in a Tx absolute value range of 0 to 5 Nm).

The design policy of the weighting ratio map is the same as that of the weighting ratio map of the weighting ratio generation part 155 regarding the above-mentioned embodiment. That is, the weighting ratio α according to the absolute value of the estimated load Tx is set for not spoiling the steering feel in case that the grip force of the steered tire 10 is insufficient (e.g., in the low μ road travel time), while reducing the influence of the friction of the mechanical components of the steering system.

In other words, based on the vehicle experiment or the like, the estimated load Tx saturation region, in which the estimated load Tx starts to saturate, is determined. Also, the weighting ratio α in such saturation region is set to a relatively small value. In such manner, the saturation of the steer torque Ts is caused in such region. In the modification 3, the estimated load Tx is assumed to be saturating at or around the absolute estimated load Tx value of 5 Nm, by design (see FIG. 19). The by-design value of 5 Nm is an example of a term "preset threshold."

The reason for setting a greater weighting ratio α for the vehicle speed V of 5 km/h in comparison to the weighting ratio α for the vehicle speed V of 40 km/h in the weighting ratio map is already mentioned in the above-described embodiment.

Here, the effects of the modification 3 are described with reference to FIG. 20.

Figure 20:
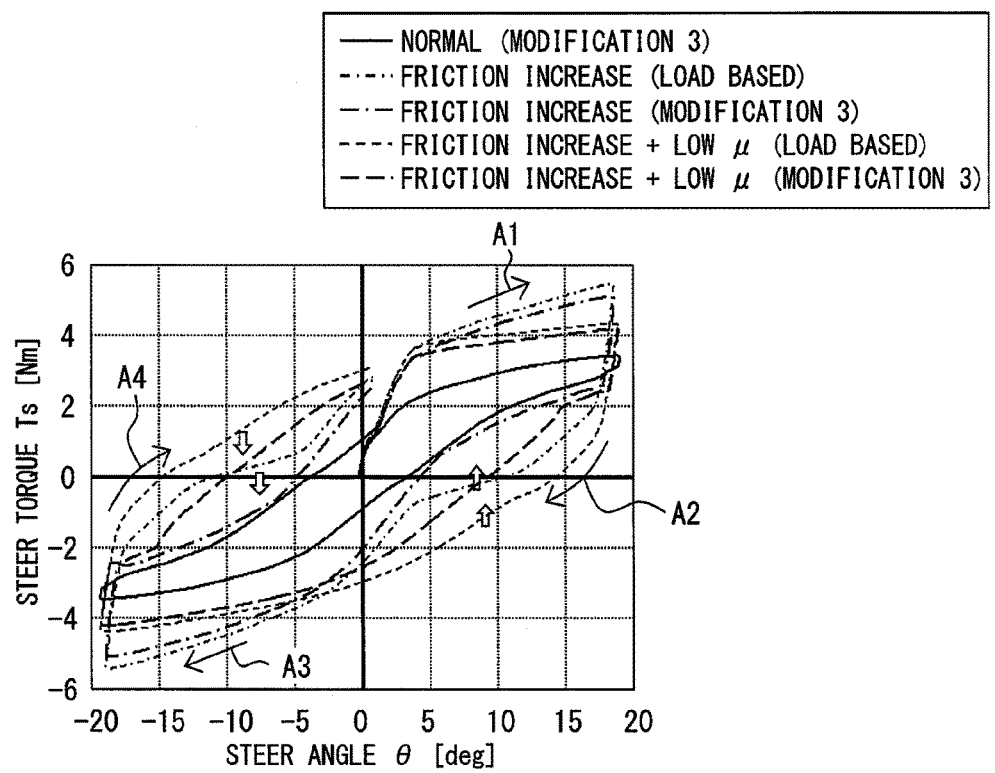
FIG. 20 is a graph of Lissajous wave forms of a relationship between the steer angle and the steer torque in a modification and in the load based configuration.

FIG. 20 corresponds to FIG. 9 which is used for the description of the above embodiment.

That is, in FIG. 20, the solid line, the one-dot long-dash line, and the long broken line respectively draw the Lissajous wave form at the time of inputting, to the subtraction part 170, the target steer torque Tid generated based on the weighting ratio α, which is generated by the weighting ratio determiner 450 of the modification 3, for the control of the steering.

The same effects as the above-described embodiment and the modification 1 are achieved according to the modification 2, which is readily seen and is understandable from FIG. 20.

Further, according to the configuration of the modification 2, while achieving the above-mentioned effects by designing the weighting ratio map based on the various test results etc., the driver's discomfort with performing a counter-steer for the control of the vehicle spin is reduced.

<Other the Modifications>

Although the present disclosure has been described in connection with preferred embodiment thereof with reference to the accompanying drawings, it is to be noted that various changes and the modifications will become apparent to those skilled in the art.

For example, in the above-mentioned embodiment and modifications, the rotation angle of the steering shaft 3 is used as the steer angle θ (i.e., as the rotation angle of the rotation member that is rotated according to an operation of the steering wheel 2). However, the rotation member used for the detection of the steer angle θ is not limited to the steering shaft 3. That is, the rotation angle of the intermediate shaft 5, of the motor 6, or of the steered tire 10 may also be used as the steer angle θ.

Further, in the modification 2, the angular velocity ω of the steering operation is calculated as a pseudo differentiation of the steer angle θ, which may be not necessarily limited to such method. For example, the rotation speed of the motor 6 may be detected as the velocity ω.

In the above-mentioned embodiments, the electric power steering system is described as a shaft-assist type, in which the rotation of the intermediate shaft 5 is assisted by the motor 6. However, the present disclosure may be applicable to the electric power steering of the other assist type.

For example, the present disclosure may be applicable to an electric power steering of rack-assist type, in which the translational movement of the rack in the steering gear box 7 is assisted by the motor 6, or to the other assist type electric power steerings.

In the above, the embodiment and the modifications are described as separate configurations. However, the embodiment and the modifications 1 to 3 may be combined in one configuration. In such case, when the absolute value of the lateral acceleration deviation is assumed to be within a region in which the grip force of the steered tire 10 is insufficient, the weighting ratio α may be set based on the lateral acceleration, and, when the steer angle-load multiplication value is assumed to be within a region in which the steer-back operation is being performed, the weighting ratio α may be set based on the steer angle-load multiplication value. In other cases, the weighting ratio α may be set by either one of the above-described two methods, or may be set as an average value of the two methods.

Such changes, the modifications, and summarized schemes are to be understood as being within the scope of the present disclosure as defined by appended claims.

What is claimed is:

1. An electric power steering controller disposed in an electric power steering system having a motor generating an assist torque that assists a steering operation of a steering member that is operated by a driver of a subject vehicle; a torque detector detecting a steer torque that is applied to the steering member; and a steer angle detector detecting a steer angle of a rotation member that rotates according to the steering operation of the steering member, the controller comprising:

an Electronic Power Steering Electronic Control Unit (EPSECU), the EPSECU configured to include:
a load estimator estimating an estimated load based on a torque that is applied to a steering mechanism for a driver-desired steering of a subject vehicle;
a load based target determiner generating a first target steer torque as a load based target steer torque based on the estimated load estimated by the load estimator;
a steer angle based target determiner generating a second target steer torque as a steer angle based target steer torque based on the steer angle detected by the steer angle detector;

a target steer torque generator generating a target steer torque as a target value of the steer torque based on the load based target steer torque and the steer angle based target steer torque; and a motor controller section controlling the motor to output the steer torque from the motor according to the target steer torque, wherein the target steer torque generator includes a weighting ratio determiner determining a weighting ratio according to a steering system state indicator value that is determined based on at least one of the steer amount of the steering member by the driver and the estimated load, and the target steer torque generator generates the target steer torque by performing a weighted addition of the load based target steer torque and the steer angle based target steer torque.

2. The electric power steering controller of claim 1, wherein when the steering system state indicator value indicates that a friction between a road surface and a steered tire is insufficient to the steering operation of the driver, the weighting ratio determiner sets the weighting ratio to increase a ratio of a component of the load based target steer torque in the target steer torque.

3. The electric power steering controller of claim 2, wherein when the steering system state indicator value is greater than a preset threshold, the weighting ratio determiner sets the weighting ratio to decrease a ratio of a component of the steer angle based target steer torque in the target steer torque as the steering system state indicator value increases.

4. The electric power steering controller of claim 1, wherein the steering system state indicator value is determined based on the estimated load estimated by the load estimator.

5. The electric power steering controller of claim 4, wherein the weighting ratio determiner includes:
a load based lateral acceleration estimator estimating a lateral acceleration of the subject vehicle based on the estimated load estimated by the load estimator; and
a steer angle based lateral acceleration estimator estimating the lateral acceleration of the subject vehicle based on the detected steer angle detected by the steer angle detector, and
a deviation between the lateral acceleration estimated by the load based lateral acceleration estimator and the lateral acceleration estimated by the steer angle based lateral acceleration estimator is used as the steering system state indicator value.

6. The electric power steering controller of claim 4, wherein the weighting ratio determiner determines the steering system state indicator value as a product of the estimated load estimated by the load estimator and the steer angle detected by the steer angle detector.

7. The electric power steering controller of claim 4, wherein the steering system state indicator value is an absolute value of the estimated load estimated by the load estimator.

8. The electric power steering controller of claim 1, wherein the weighting ratio determiner sets the weighting ratio to increase a ratio of a component of the steer angle based target steer torque in the target steer torque when the steering system state indicator value indicates a steer-back state.

9. The electric power steering controller of claim 8, wherein the weighting ratio determiner determines the steering system state indicator value as a product of (i) the steer torque detected by the torque detector and (ii) a steer angular velocity representing a per-unit-time change of the steer angle.

10. The electric power steering controller of claim 1, wherein when the steering system state indicator value indicates a spin of the subject vehicle, the weighting ratio determiner sets the weighting ratio to decrease a ratio of a component of the steer angle based target steer torque in the target steer torque to zero.

11. The electric power steering controller of claim 1, wherein the load estimator estimates the estimated load based on a sum of the assist torque outputted from the motor and the steer torque detected by the torque detector.

12. The electric power steering controller of claim 1, wherein the target steer torque generator generates the target steer torque by weighting and adding both the load based target steer torque and the steer angle based target steer torque.

13. The electric power steering controller of claim 1, wherein the target steer torque generator generates the target steer torque by adding a weighted load based target steer torque and a weighted steer angle based target steer torque.

14. The electric power steering controller of claim 1, wherein the target steer torque generator generates the target steer torque by performing a sum of a weighted load based target steer torque and a weighted steer angle based target steer torque.

15. An electric power steering system for a subject vehicle comprising a motor generating an assist torque that assists a steering operation of a steering member that is operated by a driver of the subject vehicle;

a torque detector detecting a steer torque that is applied to the steering member; and a steer angle detector detecting a steer angle of a rotation member that rotates according to the steering operation of the steering member; and an Electronic Power Steering Electronic Control Unit (EPSECU), the EPSECU configured to include:
a load estimator estimating an estimated load based on a torque that is applied to a steering mechanism for a driver-desired steering of a subject vehicle;
a load based target determiner generating a first target steer torque as a load based target steer torque based on the estimated load estimated by the load estimator;
a steer angle based target determiner generating a second target steer torque as a steer angle based target steer torque based on the steer angle detected by the steer angle detector;
a target steer torque generator generating a target steer torque as a target value of the steer torque based on the load based target steer torque and the steer angle based target steer torque; and a motor controller section controlling the motor to output the steer torque from the motor according to the target steer torque, wherein the target steer torque generator includes a weighting ratio determiner determining a weighting ratio according to a steering system state indicator value that is determined based on at least one of the steer amount of the steering member by the driver and the estimated load, and the target steer torque generator generates the target steer torque by performing a weighted addition of the load based target steer torque and the steer angle based target steer torque.

* * * * *